United States Patent
Shibuya

(10) Patent No.: US 10,645,737 B2
(45) Date of Patent: May 5, 2020

(54) WIRELESS COMMUNICATION TERMINAL, WIRELESS COMMUNICATION SYSTEM, WIRELESS COMMUNICATION METHOD, AND RECORDING MEDIUM

(71) Applicant: OLYMPUS CORPORATION, Hachioji-shi, Tokyo (JP)

(72) Inventor: Kazuyuki Shibuya, Sagamihara (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 16/108,435

(22) Filed: Aug. 22, 2018

(65) Prior Publication Data
US 2018/0359798 A1    Dec. 13, 2018

Related U.S. Application Data

(63) Continuation of application No. PCT/JP2016/062428, filed on Apr. 19, 2016.

(51) Int. Cl.
*H04W 76/14* (2018.01)
*H04W 76/10* (2018.01)
(Continued)

(52) U.S. Cl.
CPC ........... *H04W 76/14* (2018.02); *H04W 4/80* (2018.02); *H04W 52/0267* (2013.01);
(Continued)

(58) Field of Classification Search
CPC ... H04W 4/80; H04W 52/0267; H04W 76/10; H04W 76/14; H04W 80/02; H04W 88/06
See application file for complete search history.

(56) References Cited

U.S. PATENT DOCUMENTS

2005/0195775 A1*  9/2005  Petite .................. H04W 72/082
                                                      370/338
2013/0163498 A1    6/2013  Senga et al.
(Continued)

FOREIGN PATENT DOCUMENTS

JP    2012-84997 A    4/2012
JP    2013-184297 A   9/2013
(Continued)

OTHER PUBLICATIONS

Office Action dated Sep. 24, 2019, issued in counterpart JP Application No. 2018-512689, with English translation (6 pages).
(Continued)

*Primary Examiner* — Ayaz R Sheikh
*Assistant Examiner* — Debebe A Asefa
(74) *Attorney, Agent, or Firm* — Westerman, Hattori, Daniels & Adrian, LLP

(57) ABSTRACT

In a wireless communication terminal, a processor transmits instruction information to a fourth communication device of an external terminal by a second communication device when a first condition and a second condition are satisfied. The instruction information is information for instructing the external terminal to transmit a connection request for the wireless communication terminal. The first condition is a condition that a second communication connection is established between the second communication device and the fourth communication device. The second condition is a condition that the first communication device is operating in a first mode. If the connection request has been received after transmission of the instruction information, the processor establishes a first communication connection with a third communication device of the external terminal by the first communication device.

14 Claims, 22 Drawing Sheets

(51) Int. Cl.
*H04W 4/80* (2018.01)
*H04W 52/02* (2009.01)
*H04W 80/02* (2009.01)
*H04W 88/06* (2009.01)

(52) U.S. Cl.
CPC ........... *H04W 76/10* (2018.02); *H04W 80/02* (2013.01); *H04W 88/06* (2013.01)

(56) References Cited

U.S. PATENT DOCUMENTS

| | | |
|---|---|---|
| 2015/0099512 A1 | 4/2015 | Amano |
| 2017/0265066 A1* | 9/2017 | Vyas ....................... H04W 8/18 |

FOREIGN PATENT DOCUMENTS

| | | |
|---|---|---|
| JP | 2013-191933 A | 9/2013 |
| JP | 2015-73250 A | 4/2015 |
| JP | 2015-104098 A | 6/2015 |
| JP | 2015-119425 A | 6/2015 |
| JP | 2015-180043 A | 10/2015 |
| JP | 2015-220611 A | 12/2015 |
| JP | 2016-54426 A | 4/2016 |

OTHER PUBLICATIONS

International Search Report dated Jul. 5, 2016, issued in counterpart International Application No. PCT/JP2016/062428, w/English translation (4 pages).

* cited by examiner

WIRELESS COMMUNICATION TERMINAL, WIRELESS COMMUNICATION SYSTEM, WIRELESS COMMUNICATION METHOD, AND RECORDING MEDIUM

This application is a continuation application based on International Patent Application No. PCT/JP 2016/062428, filed on Apr. 19, 2016, the content of which is incorporated herein by reference.

BACKGROUND OF THE INVENTION

Field of the Invention

The present invention relates to a wireless communication terminal, a wireless communication system, a wireless communication method, and a recording medium.

Description of Related Art

In recent years, cooperation based on wireless connections between various devices and smartphones has been increasing along with high performance and high functionality of smartphones. For example, a camera and a smartphone are wirelessly connected and an image captured by the camera and stored is transmitted to the smartphone. Various types of wireless technologies are used for a wireless connection between each device and a smartphone. IEEE 802.11 and a wireless local area network (LAN) which is a series thereof are frequently used as representative wireless technologies. Bluetooth (registered trademark) is also frequently used. A combination of a plurality of wireless technologies may be used.

For example, in the technology disclosed in Japanese Unexamined Patent Application, First Publication No. 2013-191933, if a wireless communication terminal is connected to a predetermined device with Bluetooth (registered trademark), the wireless communication terminal sets the wireless LAN to an operating state. Furthermore, if the wireless LAN is disconnected, the wireless communication terminal attempts to connect the wireless LAN. In this technology, the connection of Bluetooth (registered trademark) is triggered and therefore the wireless communication terminal can be connected by the wireless LAN at a desired timing.

Generally, the number of cases in which a mobile device and a smartphone are directly connected to each other in a wireless LAN is more than the number of cases in which a mobile device and a smartphone are connected via an access point (AP) separate from these two devices. The smartphone normally operates as a station (STA). Thus, if the two devices are directly connected by a wireless LAN, it is necessary for the mobile device (e.g., a camera) connected to the smartphone to operate as an AP. Power consumption is high when the wireless LAN is operating. Thus, when the mobile device is not performing wireless communication, the mobile device disconnects the wireless LAN with the smartphone or stops the wireless LAN. When the wireless LAN is disconnected, the connected state is eliminated, but the operation of the wireless LAN (e.g., beacon transmission) continues. If the wireless LAN has stopped, transmission and reception of radio waves stop. After the wireless LAN is disconnected or stopped, the mobile device can reduce power consumption through wireless reconnection when data is transmitted to the smartphone.

SUMMARY OF THE INVENTION

According to a first aspect of the present invention, a wireless communication terminal includes a first communication device, a second communication device, and one or more processors. The first communication device performs wireless communication in accordance with a first communication protocol. The second communication device performs wireless communication in accordance with a second communication protocol. An external terminal includes a third communication device and a fourth communication device. The third communication device performs wireless communication in accordance with the first communication protocol. The fourth communication device performs wireless communication in accordance with the second communication protocol. The first communication protocol and the second communication protocol include at least a protocol of a data link layer. A first mode and a second mode are defined in the first communication protocol. The second communication protocol is different from the first communication protocol. When the first communication device operates in the first mode and the third communication device operates in the second mode, a first communication connection for data communication of a layer higher than the data link layer is able to be established in accordance with the first communication protocol between the first communication device and the third communication device. When the first communication device operates in the first mode and the third communication device operates in the second mode, only the third communication device of the first and third communication devices is able to transmit a connection request in accordance with the first communication protocol. When a first condition and a second condition are satisfied, the processor transmits instruction information to the fourth communication device by the second communication device. When the instruction information is transmitted to the fourth communication device, the first communication connection is not established between the first communication device and the third communication device. The instruction information is information for instructing the external terminal to transmit the connection request for the wireless communication terminal. The first condition is a condition that a second communication connection based on the second communication protocol is established between the second communication device and the fourth communication device. The second condition is a condition that the first communication device is operating in the first mode. If the connection request transmitted by the third communication device has been received by the first communication device after the transmission of the instruction information to the fourth communication device, the processor establishes the first communication connection with the third communication device in accordance with the first communication protocol by the first communication device. After the first communication connection is established, the processor transmits image data to the third communication device by the first communication device.

According to a second aspect of the present invention, in the first aspect, if the amount of data communication performed by the first communication device is less than or equal to a predetermined amount or if the wireless communication terminal has transitioned from a first state to a second state, the processor may cause the first communication device to stop an operation of the first mode. Power consumption of the wireless communication terminal in the second state is controlled to be less than power consumption of the wireless communication terminal in the first state. If the first condition is satisfied and the second condition is not satisfied, the processor may transmit the instruction information to the fourth communication device by the second communication device after causing the first communication device to operate in the first mode.

According to a third aspect of the present invention, in the first aspect, the wireless communication terminal may further include an image sensor that generates the image data by performing imaging.

According to a fourth aspect of the present invention, in the third aspect, the wireless communication terminal may be operable in a third mode in which the image data is transmitted to the external terminal. The processor may determine whether or not the third mode has been set in the wireless communication terminal. When the first condition, the second condition, and a third condition are satisfied, the processor may transmit the instruction information to the fourth communication device by the second communication device. The third condition is a condition that the processor determines that the third mode has been set in the wireless communication terminal.

According to a fifth aspect of the present invention, in the fourth aspect, the processor may determine a state of the first communication connection between the first communication device and the third communication device. The state of the first communication connection may be one of a connected state and a disconnected state. When the first condition, the second condition, the third condition, and a fourth condition are satisfied, the processor may transmit the instruction information to the fourth communication device by the second communication device. The fourth condition is a condition that the state of the first communication connection is the disconnected state.

According to a sixth aspect of the present invention, in the fourth aspect, a timing when the instruction information is transmitted may be a timing when the processor determines that the third mode has been set in the wireless communication terminal.

According to a seventh aspect of the present invention, in the third or fifth aspect, a timing when the instruction information is transmitted may be a timing when the image sensor performs imaging.

According to an eighth aspect of the present invention, in the fourth aspect, if the first condition and the third condition are satisfied and the second condition is not satisfied, the processor may transmit the instruction information to the fourth communication device by the second communication device after causing the first communication device to operate in the first mode.

According to a ninth aspect of the present invention, in the eighth aspect, a timing when the instruction information is transmitted may be a timing when the processor determines that the third mode has been set in the wireless communication terminal.

According to a tenth aspect of the present invention, in the eighth aspect, a timing when the instruction information is transmitted may be a timing when the image sensor performs imaging.

According to an eleventh aspect of the present invention, in the first aspect, if the amount of data communication performed by the first communication device is less than or equal to a predetermined amount or if the wireless communication terminal has transitioned from a first state to a second state, the processor may cause the first communication device to stop an operation of the first mode. Power consumption of the wireless communication terminal in the second state may be controlled to be less than power consumption of the wireless communication terminal in the first state.

According to a twelfth aspect of the present invention, a wireless communication system includes a wireless communication terminal and an external terminal. The wireless communication terminal includes a first communication device, a second communication device, and one or more processors. The first communication device performs wireless communication in accordance with a first communication protocol. The second communication device performs wireless communication in accordance with a second communication protocol. The external terminal includes a third communication device and a fourth communication device. The third communication device performs wireless communication in accordance with the first communication protocol. The fourth communication device performs wireless communication in accordance with the second communication protocol. The first communication protocol and the second communication protocol include at least a protocol of a data link layer. A first mode and a second mode are defined in the first communication protocol. The second communication protocol is different from the first communication protocol. When the first communication device operates in the first mode and the third communication device operates in the second mode, a first communication connection for data communication of a layer higher than the data link layer is able to be established in accordance with the first communication protocol between the first communication device and the third communication device. When the first communication device operates in the first mode and the third communication device operates in the second mode, only the third communication device of the first and third communication devices is able to transmit a connection request in accordance with the first communication protocol. When a first condition and a second condition are satisfied, the processor transmits instruction information to the fourth communication device by the second communication device. When the instruction information is transmitted to the fourth communication device, the first communication connection is not established between the first communication device and the third communication device. The instruction information is information for instructing the external terminal to transmit the connection request for the wireless communication terminal. The first condition is a condition that a second communication connection based on the second communication protocol is established between the second communication device and the fourth communication device. The second condition is a condition that the first communication device is operating in the first mode. If the connection request transmitted by the third communication device has been received by the first communication device after the transmission of the instruction information to the fourth communication device, the processor establishes the first communication connection with the third communication device in accordance with the first communication protocol by the first communication device. After the first communication connection is established, the processor transmits image data to the third communication device by the first communication device. The fourth communication device receives the instruction information transmitted by the second communication device. After the instruction information is received, the third communication device transmits the connection request to the first communication device. After the connection request is transmitted, the third communication device establishes the first communication connection with the first communication device. After the first communication connection is established, the third communication device receives the image data from the first communication device.

According to a thirteenth aspect of the present invention, a wireless communication method has a first step, a second step, and a third step executed by a wireless communication terminal. The wireless communication terminal includes a first communication device and a second communication device. The first communication device performs wireless communication in accordance with a first communication protocol. The second communication device performs wireless communication in accordance with a second communication protocol. An external terminal includes a third communication device and a fourth communication device. The third communication device performs wireless communication in accordance with the first communication protocol. The fourth communication device performs wireless communication in accordance with the second communication protocol. The first communication protocol and the second communication protocol include at least a protocol of a data link layer. A first mode and a second mode are defined in the first communication protocol. The second communication protocol is different from the first communication protocol. When the first communication device operates in the first mode and the third communication device operates in the second mode, a first communication connection for data communication of a layer higher than the data link layer is able to be established in accordance with the first communication protocol between the first communication device and the third communication device. When the first communication device operates in the first mode and the third communication device operates in the second mode, only the third communication device of the first and third communication devices is able to transmit a connection request in accordance with the first communication protocol. When a first condition and a second condition are satisfied, the second communication device transmits instruction information to the fourth communication device in the first step. When the instruction information is transmitted to the fourth communication device, the first communication connection is not established between the first communication device and the third communication device. The instruction information is information for instructing the external terminal to transmit the connection request for the wireless communication terminal. The first condition is a condition that a second communication connection based on the second communication protocol is established between the second communication device and the fourth communication device. The second condition is a condition that the first communication device is operating in the first mode. If the connection request transmitted by the third communication device has been received by the first communication device after the transmission of the instruction information to the fourth communication device, the first communication device establishes the first communication connection with the third communication device in accordance with the first communication protocol in the second step. After the first communication connection is established, the first communication device transmits image data to the third communication device in the third step.

According to a fourteenth aspect of the present invention, there is provided a computer-readable non-transitory recording medium recording a program for causing a computer of a wireless communication terminal to execute a first step, a second step, and a third step. The wireless communication terminal includes a first communication device and a second communication device. The first communication device performs wireless communication in accordance with a first communication protocol. The second communication device performs wireless communication in accordance with a second communication protocol. An external terminal includes a third communication device and a fourth communication device. The third communication device performs wireless communication in accordance with the first communication protocol. The fourth communication device performs wireless communication in accordance with the second communication protocol. The first communication protocol and the second communication protocol include at least a protocol of a data link layer. A first mode and a second mode are defined in the first communication protocol. The second communication protocol is different from the first communication protocol. When the first communication device operates in the first mode and the third communication device operates in the second mode, a first communication connection for data communication of a layer higher than the data link layer is able to be established in accordance with the first communication protocol between the first communication device and the third communication device. When the first communication device operates in the first mode and the third communication device operates in the second mode, only the third communication device of the first and third communication devices is able to transmit a connection request in accordance with the first communication protocol. When a first condition and a second condition are satisfied, the second communication device transmits instruction information to the fourth communication device in the first step. When the instruction information is transmitted to the fourth communication device, the first communication connection is not established between the first communication device and the third communication device. The instruction information is information for instructing the external terminal to transmit the connection request for the wireless communication terminal. The first condition is a condition that a second communication connection based on the second communication protocol is established between the second communication device and the fourth communication device. The second condition is a condition that the first communication device is operating in the first mode. If the connection request transmitted by the third communication device has been received by the first communication device after the transmission of the instruction information to the fourth communication device, the first communication device establishes the first communication connection with the third communication device in accordance with the first communication protocol in the second step. After the first communication connection is established, the first communication device transmits image data to the third communication device in the third step.

DETAILED DESCRIPTION OF THE INVENTION

Embodiments of the present invention will be described with reference to the drawings.

First Embodiment

Figure 1:
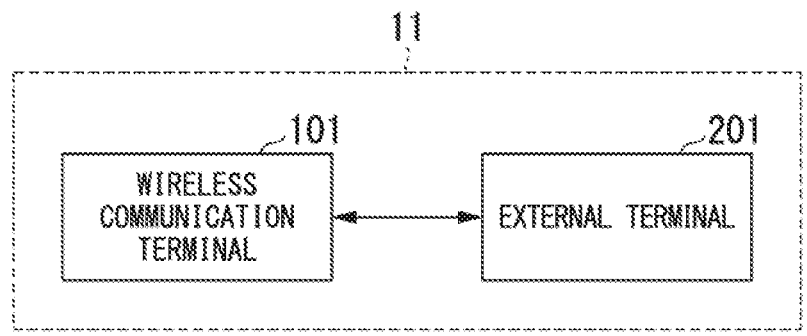
FIG. 1 is a block diagram showing a configuration of a wireless communication system according to a first embodiment of the present invention.

FIG. 1 shows a configuration of a wireless communication system 11 according to a first embodiment of the present invention. As shown in FIG. 1, the wireless communication system 11 includes a wireless communication terminal 101 and an external terminal 201. The wireless communication terminal 101 and the external terminal 201 perform wireless communication. In FIG. 1, one wireless communication terminal 101 and one external terminal 201 are shown. A plurality of wireless communication terminals 101 or a plurality of external terminals 201 may exist.

Figure 2:
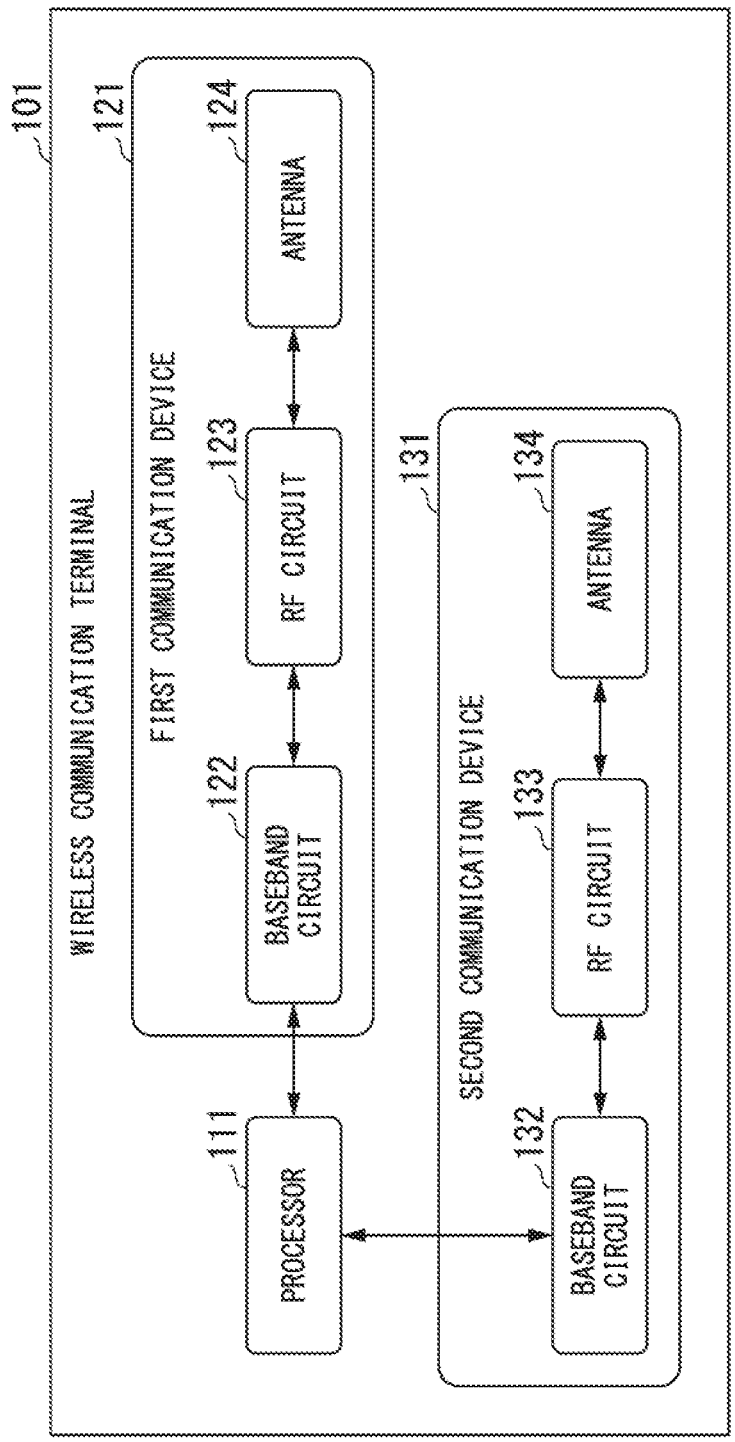
FIG. 2 is a block diagram showing a hardware configuration of a wireless communication terminal according to the first embodiment of the present invention.

FIG. 2 shows a hardware configuration of the wireless communication terminal 101. As shown in FIG. 2, the wireless communication terminal 101 includes a processor 111, a first communication device 121, and a second communication device 131.

Figure 3:
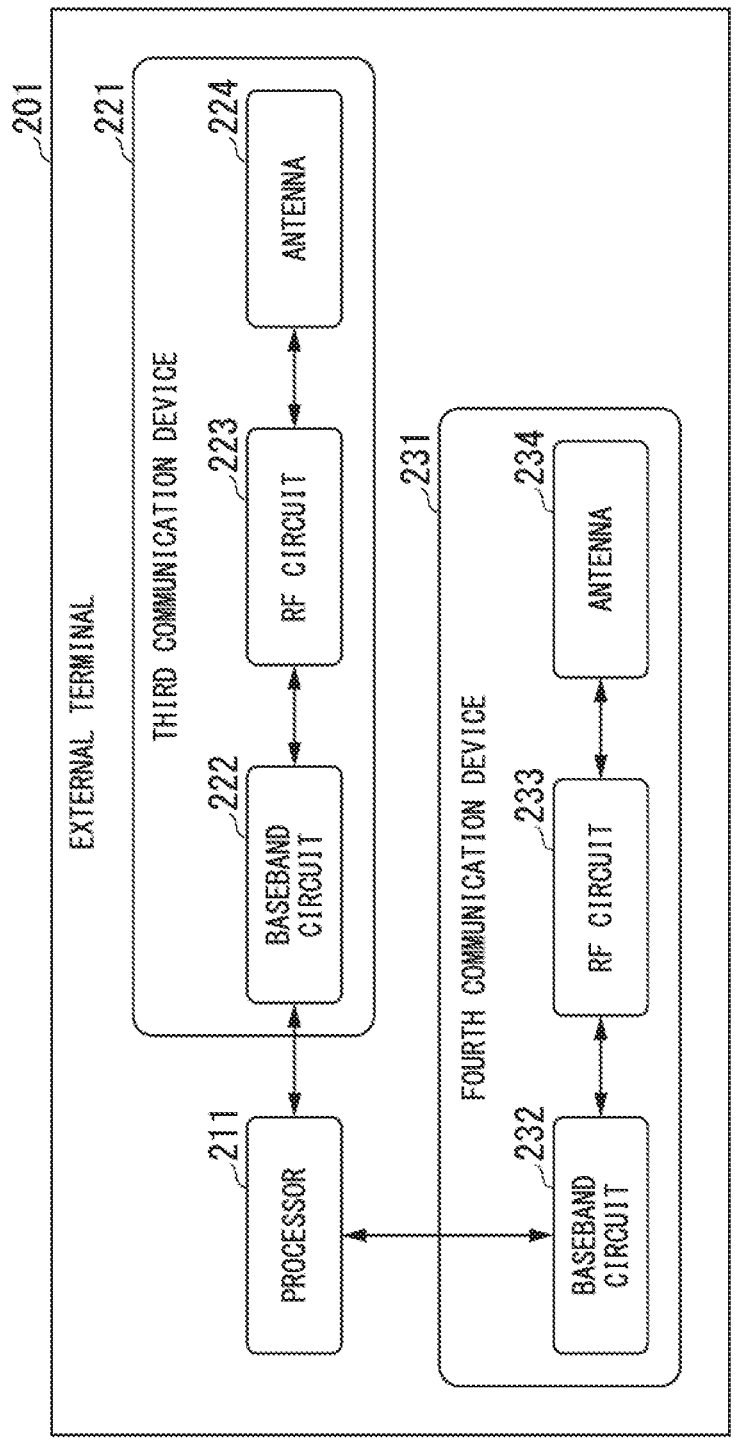
FIG. 3 is a block diagram showing a hardware configuration of an external terminal according to the first embodiment of the present invention.

FIG. 3 shows a hardware configuration of the external terminal 201. As shown in FIG. 3, the external terminal 201 includes a processor 211, a third communication device 221, and a fourth communication device 231.

A schematic configuration of the wireless communication terminal 101 and the external terminal 201 will be described. The first communication device 121 performs wireless communication in accordance with a first communication protocol. The second communication device 131 performs wireless communication in accordance with a second communication protocol. The third communication device 221 performs wireless communication in accordance with the first communication protocol. The fourth communication device 231 performs wireless communication in accordance with the second communication protocol. The first communication protocol and the second communication protocol include at least a data link layer protocol. In the first communication protocol, a first mode and a second mode are defined. The second communication protocol is different from the first communication protocol. When the first communication device 121 operates in the first mode and the third communication device 221 operates in the second mode, a first communication connection for data communication of a layer higher than the data link layer is able to be established in accordance with the first communication protocol between the first communication device 121 and the third communication device 221. When the first communication device 121 operates in the first mode and the third communication device 221 operates in the second mode, only the third communication device 221 of the first and third communication devices 121 and 221 can transmit a connection request in accordance with the first communication protocol.

When a first condition and a second condition are satisfied, the processor 111 transmits the instruction information to the fourth communication device 231 by the second communication device 131. When the instruction information is transmitted to the fourth communication device 231, the first communication connection is not established between the first communication device 121 and the third communication device 221. The instruction information is information for instructing the external terminal 201 to transmit a connection request for the wireless communication terminal 101. The first condition is a condition that the second communication connection based on the second communication protocol is established between the second communication device 131 and the fourth communication device 231. The second condition is a condition that the first communication device 121 is operating in the first mode.

If the connection request transmitted by the third communication device 221 is received by the first communication device 121 after the instruction information is transmitted to the fourth communication device 231, the processor 111 establishes a first communication connection with the third communication device 221 in accordance with the first communication protocol by the first communication device 121. After the first communication connection is established, the processor 111 performs data communication with the third communication device 221 by the first communication device 121. The fourth communication device 231 receives the instruction information transmitted by the second communication device 131. After the instruction information is received, the third communication device 221 transmits the connection request to the first communication device 121. After the connection request is transmitted, the third communication device 221 establishes the first communication connection with the first communication device 121. After the first communication connection is established, the third communication device 221 performs data communication with the first communication device 121.

It is only necessary for the first communication protocol and the second communication protocol to be communication protocols including at least the protocol of the data link layer. The data link layer is one layer of an open systems interconnection (OSI) reference model. For example, the first communication protocol is a wireless LAN. For example, the first mode is a master device mode and the second mode is a slave device mode. In the wireless LAN, the terminal operating in the first mode is an access point (AP). In the wireless LAN, the terminal operating in the second mode is a station (STA). The connection request is a message in a format defined by the first communication protocol. For example, data communication of a layer higher than the data link layer is data communication of an application layer. For example, the second communication protocol is Bluetooth (registered trademark). The second communication protocol may be any of NFC, RFID, TransferJet (registered trademark), infrared communication, and the like. The instruction information is a message in a format defined by the second communication protocol.

The second communication device 131 and the fourth communication device 231 operate in accordance with the second communication protocol. In the second communication protocol, a first mode similar to the first mode of the first communication protocol may be defined and a second mode similar to the second mode of the first communication protocol may be defined. Alternatively, the first mode and the second mode need not be defined in the second communication protocol. If the first mode and the second mode are defined in the second communication protocol, the second communication device 131 and the fourth communication device 231 may operate in either the first mode or the second mode.

Detailed configurations of the wireless communication terminal 101 and the external terminal 201 will be described. The wireless communication terminal 101 has one or more processors. In FIG. 2, one processor 111 is shown. For example, the processor 111 includes a central processing unit (CPU), a digital signal processor (DSP), a graphics processing unit (GPU), or the like. The processor 111 may be configured as an application specific integrated circuit (ASIC) or a field-programmable gate array (FPGA). The processor 111 controls the operation of the wireless communication terminal 101.

For example, the function of the processor 111 can be implemented as a function of software by the processor 111 reading and executing a program including instructions defining the operation of the processor 111. This program may be provided by a "computer-readable recording medium" such as, for example, a flash memory. Also, the above-described program may be transmitted from a computer having a storage device storing the program or the like via a transmission medium or transmitted to the wireless communication terminal 101 by transmission waves in a transmission medium. The "transmission medium" for transmitting the program refers to a medium having a function of transmitting information, such as a network (a communication network) like the Internet or a communication circuit (a communication line) like a telephone circuit. Also, the above-described program may be a program for implementing some of the above-described functions. Further, the above-described program may be a program capable of implementing the above-described functions in combination with a program already recorded on the computer system, i.e., a so-called differential file (differential program).

For example, the first communication device 121 is a wireless module. The first communication device 121 includes a baseband circuit 122, an RF circuit 123, and an antenna 124. The baseband circuit 122 performs digital signal processing in accordance with an instruction from the processor 111 and converts a digital signal into an analog signal through D/A conversion. The analog signal generated by the baseband circuit 122 is output to the RF circuit 123. Also, the baseband circuit 122 converts an analog signal output from the RF circuit 123 into a digital signal through A/D conversion and performs processing on the digital signal. In processing performed on the digital signal by the baseband circuit 122, a part of processing of a media access control (MAC) layer is controlled by the processor 111. The MAC layer is included in the data link layer.

The RF circuit 123 modulates the analog signal output from the baseband circuit 122 into an analog signal of a frequency band of carrier waves. The analog signal obtained through modulation performed by the RF circuit 123 is output to the antenna 124. Also, the RF circuit 123 demodulates an analog signal of the frequency band of carrier waves output from the antenna 124. The analog signal demodulated by the RF circuit 123 is output to the baseband circuit 122. The antenna 124 converts the analog signal output from the RF circuit 123 into radio waves and transmits the radio waves to the external terminal 201. Also, the antenna 124 receives radio waves transmitted from the external terminal 201 and converts the received radio waves into an analog signal. The analog signal processed by the antenna 124 is output to the RF circuit 123.

Only the first mode of the first and second modes can be set in the first communication device 121. The first communication device 121 can be set to a state in which the first mode is set and a state in which the setting of the first mode is released.

For example, the second communication device 131 is a wireless module. The second communication device 131 includes a baseband circuit 132, an RF circuit 133, and an antenna 134. A function of the baseband circuit 132 is similar to the function of the baseband circuit 122. A function of the RF circuit 133 is similar to the function of the RF circuit 123. A function of the antenna 134 is similar to the function of the antenna 124.

The processor 111 transmits data or information to the external terminal 201 by the first communication device 121 or the second communication device 131. Specifically, the processor 111 controls the first communication device 121 or the second communication device 131 so that data or information is transmitted to the external terminal 201. That is, the processor 11 causes the first communication device 121 or the second communication device 131 to transmit data or information for the external terminal 201. Thereby, the first communication device 121 or the second communication device 131 transmits data or information to the external terminal 201. The processor 111 receives data or information from the external terminal 201 by the first communication device 121 or the second communication device 131. Specifically, the processor 111 controls the first communication device 121 or the second communication device 131 so that data or information is received from the external terminal 201. That is, the processor 111 causes the first communication device 121 or the second communication device 131 to receive data or information transmitted from the external terminal 201. Thereby, the first communication device 121 or the second communication device 131 receives data or information from the external terminal 201.

The wireless communication terminal 101 may have a configuration which is not shown in FIG. 2. For example, the wireless communication terminal 101 may include at least one of a monitor, an operation unit, and a memory.

As shown in FIG. 2, the antenna 124 and the antenna 134 are arranged inside the communication device. The antenna 124 and the antenna 134 may be arranged outside the communication device. The antenna 124 may be arranged inside the first communication device 121 and the antenna 134 may be arranged outside the second communication device 131. Alternatively, the antenna 124 may be arranged outside the first communication device 121 and the antenna 134 may be arranged inside the second communication device 131. As shown in FIG. 2, the antenna 124 and the antenna 134 are configured as different antennas. One antenna may be shared by the first communication device 121 and the second communication device 131.

The external terminal 201 has one or more processors. In FIG. 3, one processor 211 is shown. For example, the processor 211 includes a CPU, DSP, GPU, or the like. The processor 211 may include an application specific integrated circuit or an FPGA. The processor 211 controls the operation of the external terminal 201. The processor 211 is optional as a component of an external terminal with which the wireless communication device according to each aspect of the present invention wirelessly communicates.

For example, the function of the processor 211 can be implemented as a function of software by the processor 211 reading and executing a program including instructions defining the operation of the processor 211. An implementation form of this program is similar to an implementation form of a program for implementing the function of the processor 111.

For example, the third communication device 221 is a wireless module. The third communication device 221 includes a baseband circuit 222, an RF circuit 223, and an antenna 224. The baseband circuit 222 performs digital signal processing in accordance with an instruction from the processor 211, and converts the digital signal into an analog signal through D/A conversion. The analog signal generated by the baseband circuit 222 is output to the RF circuit 223. The baseband circuit 222 converts an analog signal output from the RF circuit 223 into a digital signal through A/D conversion and performs processing on the digital signal. In the processing performed on the digital signal by the baseband circuit 222, a part of the processing of the MAC layer is controlled by the processor 211.

The RF circuit 223 modulates the analog signal output from the baseband circuit 222 into an analog signal of the frequency band of carrier waves. The analog signal obtained through modulation performed by the RF circuit 223 is output to the antenna 224. Also, the RF circuit 223 demodulates the analog signal in the frequency band of the carrier waves output from the antenna 224. The analog signal demodulated by the RF circuit 223 is output to the baseband circuit 222. The antenna 224 converts the analog signal output from the RF circuit 223 into radio waves and transmits the radio waves to the wireless communication terminal 101. Also, the antenna 224 receives the radio waves transmitted from the wireless communication terminal 101 and converts the received radio waves into an analog signal. The analog signal processed by the antenna 224 is output to the RF circuit 223.

Only the second mode of the first and second modes can be set in the third communication device 221. The third communication device 221 can be set to a state in which the second mode is set and a state in which the setting of the second mode is released. Only the third communication device 221 of the first and third communication devices 121 and 221 can transmit the connection request in accordance with the first communication protocol.

For example, the fourth communication device 231 is a wireless module. The fourth communication device 231 includes a baseband circuit 232, an RF circuit 233, and an antenna 234. A function of the baseband circuit 232 is similar to the function of the baseband circuit 222. A function of the RF circuit 233 is similar to the function of the RF circuit 223. A function of the antenna 234 is similar to the function of the antenna 224.

The processor 211 transmits data or information to the wireless communication terminal 101 by the third communication device 221 or the fourth communication device 231. Specifically, the processor 211 controls the third communication device 221 or the fourth communication device 231 so that data or information is transmitted to the wireless communication terminal 101. That is, the processor 211 causes the third communication device 221 or the fourth communication device 231 to transmit data or information for the wireless communication terminal 101. Thereby the third communication device 221 or the fourth communication device 231 transmits data or information to the wireless communication terminal 101. The processor 211 receives data or information from the wireless communication terminal 101 by the third communication device 221 or the fourth communication device 231. Specifically, the processor 211 controls the third communication device 221 or the fourth communication device 231 so that data or information is received from the wireless communication terminal 101. That is, the processor 211 causes the third communication device 221 or the fourth communication device 231 to receive data or information transmitted from the wireless communication terminal 101. Thereby, the third communication device 221 or the fourth communication device 231 receives data or information from the wireless communication terminal 101.

The external terminal 201 may have a configuration which is not shown in FIG. 3. For example, the external terminal 201 may include at least one of a monitor, an operation unit, and a memory.

As shown in FIG. 3, the antenna 224 and the antenna 234 are arranged inside the communication device. The antenna 224 and the antenna 234 may be arranged outside the communication device. The antenna 224 may be arranged inside the third communication device 221 and the antenna 234 may be arranged outside the fourth communication device 231. Alternatively, the antenna 224 may be arranged outside the third communication device 221 and the antenna 234 may be arranged inside the fourth communication device 231. As shown in FIG. 3, the antenna 224 and the antenna 234 are configured as different antennas. One antenna may be shared by the third communication device 221 and the fourth communication device 231.

Figure 4:
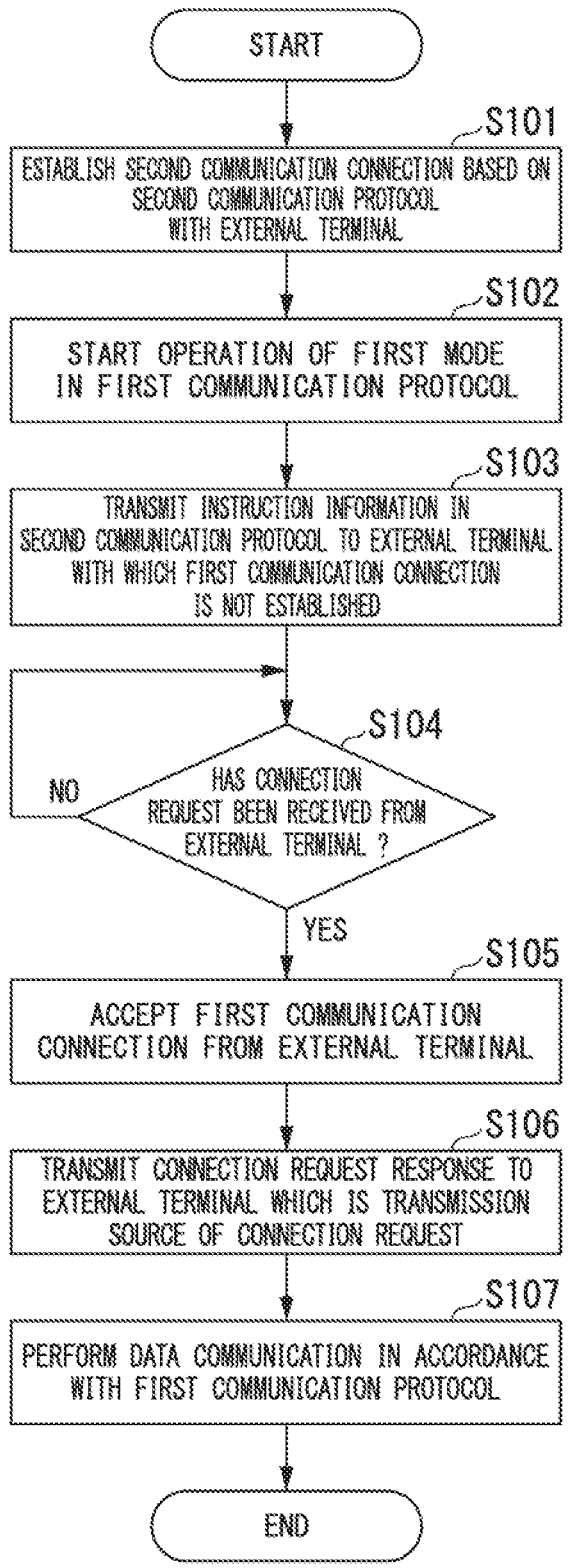
FIG. 4 is a flowchart showing a procedure of an operation of the wireless communication terminal according to the first embodiment of the present invention.

The operation of the wireless communication terminal 101 will be described. FIG. 4 shows the operation of the wireless communication terminal 101.

(Step S101)

The processor 111 establishes a second communication connection based on the second communication protocol with the fourth communication device 231 by the second communication device 131. That is, the processor 111 instructs the second communication device 131 to establish the second communication connection. The second communication device 131 establishes the second communication connection with the fourth communication device 231. Thereby, the second communication connection is established between the wireless communication terminal 101 and the external terminal 201.

With respect to the establishment of the second communication connection, the wireless communication terminal 101 establishes a connection to the external terminal 201 or accepts a connection from the external terminal 201. According to a type of wireless communication scheme to which the second communication protocol corresponds, a role of the terminal is limited to a role in establishing a connection or accepting a connection. For example, the wireless communication terminal 101 plays a role in establishing a connection in accordance with the second communication protocol, and the external terminal 201 plays a role in accepting the connection in accordance with the second communication protocol. Alternatively, the wireless communication terminal 101 plays a role in accepting the connection in accordance with the second communication protocol and the external terminal 201 plays a role in establishing the connection in accordance with the second communication protocol. If the role of the terminal is not limited, the wireless communication terminal 101 and the external terminal 201 can perform both the execution of the connection and the acceptance of the connection in accordance with the second communication protocol. Communication from one terminal to the other terminal is performed only once with respect to the establishment of the second communication connection. Alternatively, communication is performed a plurality of times between one terminal and the other terminal.

(Step S102)

After the second communication connection is established, the processor ill causes the first communication device 121 to operate in the first mode. That is, the processor 111 instructs the first communication device 121 to start the operation of the first mode. The first communication device 121 starts the operation of the first mode. The order of the processing of steps S101 and S102 is not limited to the order shown in FIG. 4. For example, after the processing of step S102 is performed, the processing of step S101 may be performed.

(Step S103)

After the operation of the first mode is started, the processor 111 asks the first communication device 121 about the state of the first communication connection. The state of the first communication connection is a connected state or a disconnected state. The connected state is a state in which the connection is maintained. That is, the connected state is a state in which the first communication device 121 and the third communication device 221 can perform data communication. The disconnected state is a state in which the first communication device 121 and the third communication device 221 are not connected. That is, the disconnected state is a state in which the first communication device 121 and the third communication device 221 cannot perform data communication. The first communication device 121 responds to the processor 111 with the state of the first communication connection. The processor 111 determines the state of the first communication connection on the basis of the response from the first communication device 121. If the processor 111 determines that the state of the first communication connection is the disconnected state, the processor 111 transmits instruction information to the fourth communication device 231 by the second communication device 131. That is, the processor 111 instructs the second communication device 131 to transmit the instruction information. The second communication device 131 transmits the instruction information to the fourth communication device 231.

When the instruction information is transmitted to the fourth communication device 231 in step S103, the first communication connection is not established between the first communication device 121 and the third communication device 221. In step S103, a second communication connection has already been established between the second communication device 131 and the fourth communication device 231. That is, the first condition is satisfied. In step S103, the first communication device 121 operates in the first mode. That is, the second condition is satisfied.

(Step S104)

If a connection request has been transmitted from the third communication device 221, the first communication device 121 receives the connection request. The connection request in the wireless LAN is an association request. The processor 111 monitors the first communication device 121 and determines whether or not the connection request has been received. If the processor 111 determines that the connection request has not been received, the processing of step S104 continues.

(Step S105)

If the processor 111 determines that the connection request has been received, the processor 111 establishes a first communication connection with the third communication device 221 in accordance with the first communication protocol by the first communication device 121. That is, the processor 111 instructs the first communication device 121 to accept the first communication connection. The first communication device 121 accepts the first communication connection. Thereby, the first communication device 121 establishes the first communication connection with the third communication device 221. As a result, the first communication connection is established between the wireless communication terminal 101 and the external terminal 201.

For example, the acceptance of the first communication connection is performed in the following processing. The processor 111 determines whether or not the security and the communication speed notified through the connection request are allowable. If the security and the communication speed are allowable, the processor 111 determines whether or not the number of terminals connected to the wireless communication terminal 101 exceeds an upper limit after the first communication connection with the external terminal 201 is accepted. If the processor 111 determines that the number of terminals does not exceed the upper limit, the first communication connection is accepted.

(Step S106)

After the first communication connection is accepted, the first communication device 121 transmits a connection request response to the third communication device 221 on the basis of an instruction of acceptance of the first communication connection from the processor 111. Thereby the connection request response is transmitted to the external terminal 201 which is a transmission source of the connection request and the establishment of the first communication connection is completed. The connection request response in the wireless LAN is an association response. The processor 111 performs communication for authentication with the third communication device 221 by the first communication device 121 in accordance with the setting of the wireless network. The communication for authentication is optional. If the authentication has succeeded, the wireless communication terminal 101 transitions from a communication disabled state to a data communication enabled state. Alternatively, if the communication for authentication is unnecessary, the wireless communication terminal 101 transitions from the communication disabled state to the data communication enabled state.

(Step S107)

After the connection request response is transmitted, the processor 111 performs data communication with the third communication device 221 by the first communication device 121. That is, the processor 111 instructs the first communication device 121 to perform data communication. The first communication device 121 performs data communication with the third communication device 221. Data communication may be started by the first communication device 121 receiving data from the third communication device 221. The data transmitted between the wireless communication terminal 101 and the external terminal 201 may be any of image data, voice data, and document data. The data transmitted between the wireless communication terminal 101 and the external terminal 201 may be data other than the above data. For example, as described in the fifth embodiment, the data transmitted between the wireless communication terminal 101 and the external terminal 201 may be sensor data.

After the first communication connection is established, authentication and data communication encryption may be performed in data communication in accordance with the first communication protocol. After the second communication connection is established, authentication and data communication encryption may be performed in data communication in accordance with the second communication protocol.

The operation of the external terminal 201 corresponding to the operation of the wireless communication terminal 101 will be described. The processor 211 causes the third communication device 221 to operate in the second mode. That is, the processor 211 instructs the third communication device 221 to start the operation of the second mode. The third communication device 221 starts the operation of the second mode.

The processor 211 establishes the second communication connection based on the second communication protocol with the second communication device 131 by the fourth communication device 231. That is, the processor 211 instructs the fourth communication device 231 to establish the second communication connection. The fourth communication device 231 establishes the second communication connection with the second communication device 131.

The fourth communication device 231 receives the instruction information from the second communication device 131. If the instruction information has been received, the processor 211 transmits a connection request to the first communication device 121 by the third communication device 221. That is, the processor 211 instructs the third communication device 221 to transmit the connection request. The third communication device 221 transmits the connection request to the first communication device 121.

After the connection request is transmitted, the processor 211 establishes the first communication connection with the first communication device 121 in accordance with the first communication protocol by the third communication device 221. That is, the processor 211 instructs the third communication device 221 to establish the first communication connection. The third communication device 221 establishes the first communication connection with the first communication device 121. The third communication device 221 receives a connection request response from the first communication device 121. Thereby, the establishment of the first communication connection is completed.

The processor 211 performs data communication with the first communication device 121 by the third communication device 221. That is, the processor 211 instructs the third communication device 221 to perform data communication. The third communication device 221 performs data communication with the first communication device 121. Data communication may be started by the third communication device 221 receiving data from the first communication device 121.

Figure 5:
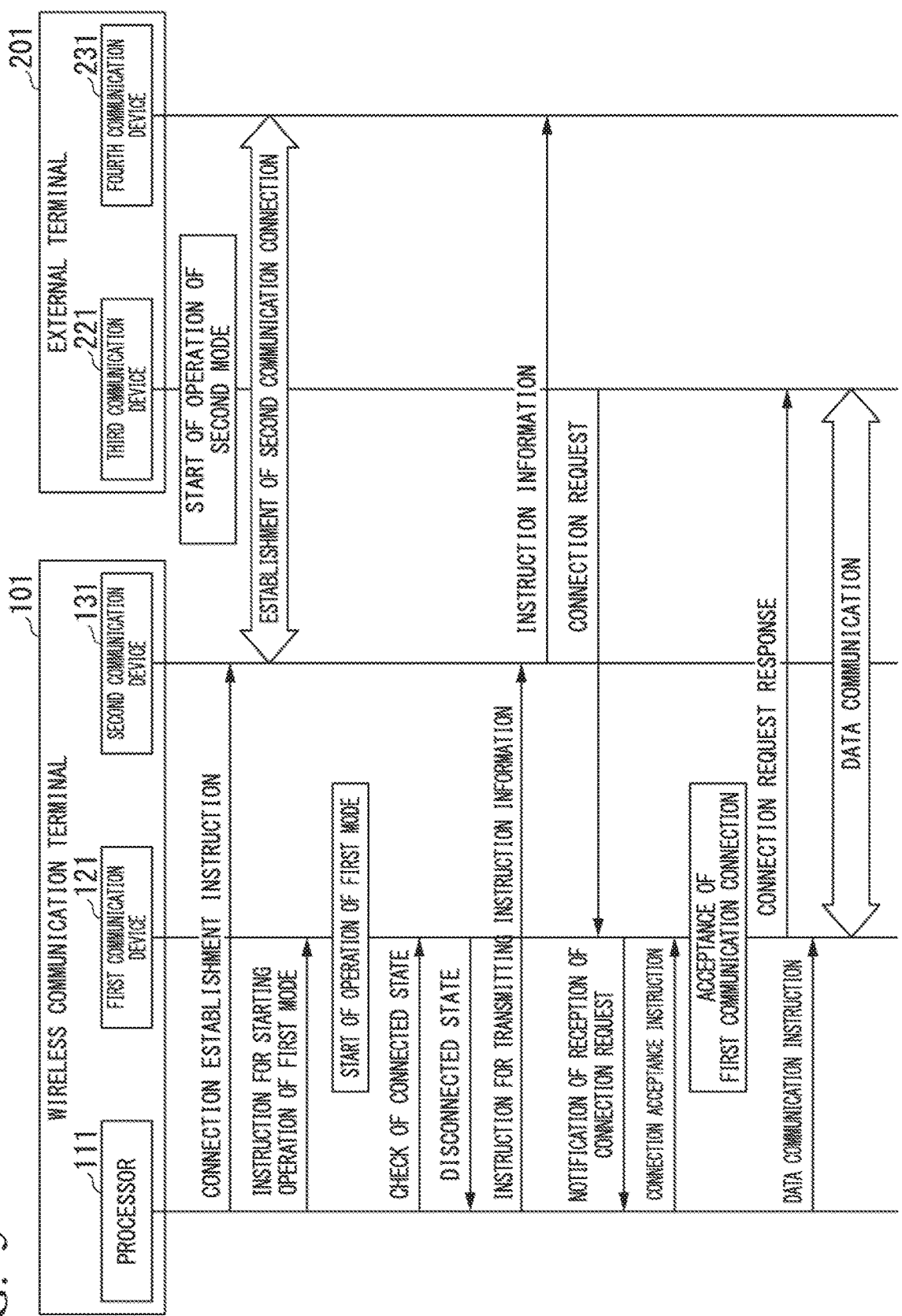
FIG. 5 is a sequence diagram showing a communication procedure in the first embodiment of the present invention.

FIG. 5 shows a procedure of communication between the wireless communication terminal 101 and the external terminal 201. The operation of each terminal will be described with reference to FIG. 5.

In the external terminal 201, the third communication device 221 starts the operation of the second mode. On the other hand, in the wireless communication terminal 101, the processor 111 instructs the second communication device 131 to establish the second communication connection (step S101). The second communication device 131 establishes the second communication connection with the fourth communication device 231 (step S101).

After the second communication connection is started, the processor 111 instructs the first communication device 121 to start the operation of the first mode (step S102). The first communication device 121 starts the operation of the first mode (step S102).

After the first communication device 121 starts the operation of the first mode, the processor 111 checks the state of the first communication connection by asking the first communication device 121 about the state of the first communication connection (step S103). The first communication device 121 responds to the processor 111 with the state of the first communication connection which is the disconnected state (step S103). Because the state of the first communication connection is the disconnected state, the processor 111 instructs the second communication device 131 to transmit the instruction information (step S103). The second communication device 131 transmits the instruction information to the fourth communication device 231 (step S103).

In the external terminal 201, the fourth communication device 231 receives the instruction information from the second communication device 131. After the instruction information is received, the third communication device 221 transmits the connection request to the first communication device 121.

In the wireless communication terminal 101, the first communication device 121 receives a connection request from the third communication device 221 (step S104). The first communication device 121 notifies the processor 111 of the reception of the connection request (step S104).

After the connection request is received, the processor 111 instructs the first communication device 121 to accept the first communication connection (step S105). The first communication device 121 accepts the first communication connection (step S105). Thereafter, the first communication device 121 transmits a connection request response to the third communication device 221 (step S106).

After the connection request response is transmitted, the processor 111 instructs the first communication device 121 to perform data communication (step S107). The first communication device 121 performs data communication with the third communication device 221 (step S107).

The operation of the second mode by the third communication device 221 may be started at a timing which is later than the timing shown in FIG. 5. For example, the third communication device 221 may start the operation of the second mode after the second communication connection is established and before the instruction information is received.

The wireless communication method according to each aspect of the present invention is based on the operation shown in FIG. 4. The wireless communication method includes a first step (step S103), a second step (step S105), and a third step (step S107) executed by the wireless communication terminal 101. When the first condition and the second condition are satisfied, the second communication device 131 transmits the instruction information to the fourth communication device 231 in the first step. The first condition is a condition that the second communication connection based on the second communication protocol is established between the second communication device 131 and the fourth communication device 231. The second condition is a condition that the first communication device 121 is operating in the first mode. If the connection request transmitted by the third communication device 221 is received by the first communication device 121 after the instruction information is transmitted to the fourth communication device 231, the first communication device 121 establishes a first communication connection with the third communication device 221 in accordance with the first communication protocol in the second step. After the first communication connection is established, the first communication device 121 performs data communication with the third communication device 221 in the third step.

The wireless communication method according to each aspect of the present invention need not have processing other than the processing corresponding to the above-described first to third steps.

As described above, the instruction information for instructing the external terminal 201 to transmit the connection request for the wireless communication terminal 101 is transmitted to the fourth communication device 231 of the external terminal 201 by the second communication device 131 of the wireless communication terminal 101. If the connection request transmitted by the third communication device 221 of the external terminal 201 has been received by the first communication device 121 of the wireless communication terminal 101, the first communication connection is established between the first communication device 121 and the third communication device 221. Thus the wireless communication terminal 101 operable in the first mode can be wirelessly connected to the external terminal 201 operating in the second mode on the basis of a trigger from the wireless communication terminal 101.

Modified Example of First Embodiment

Figure 6:
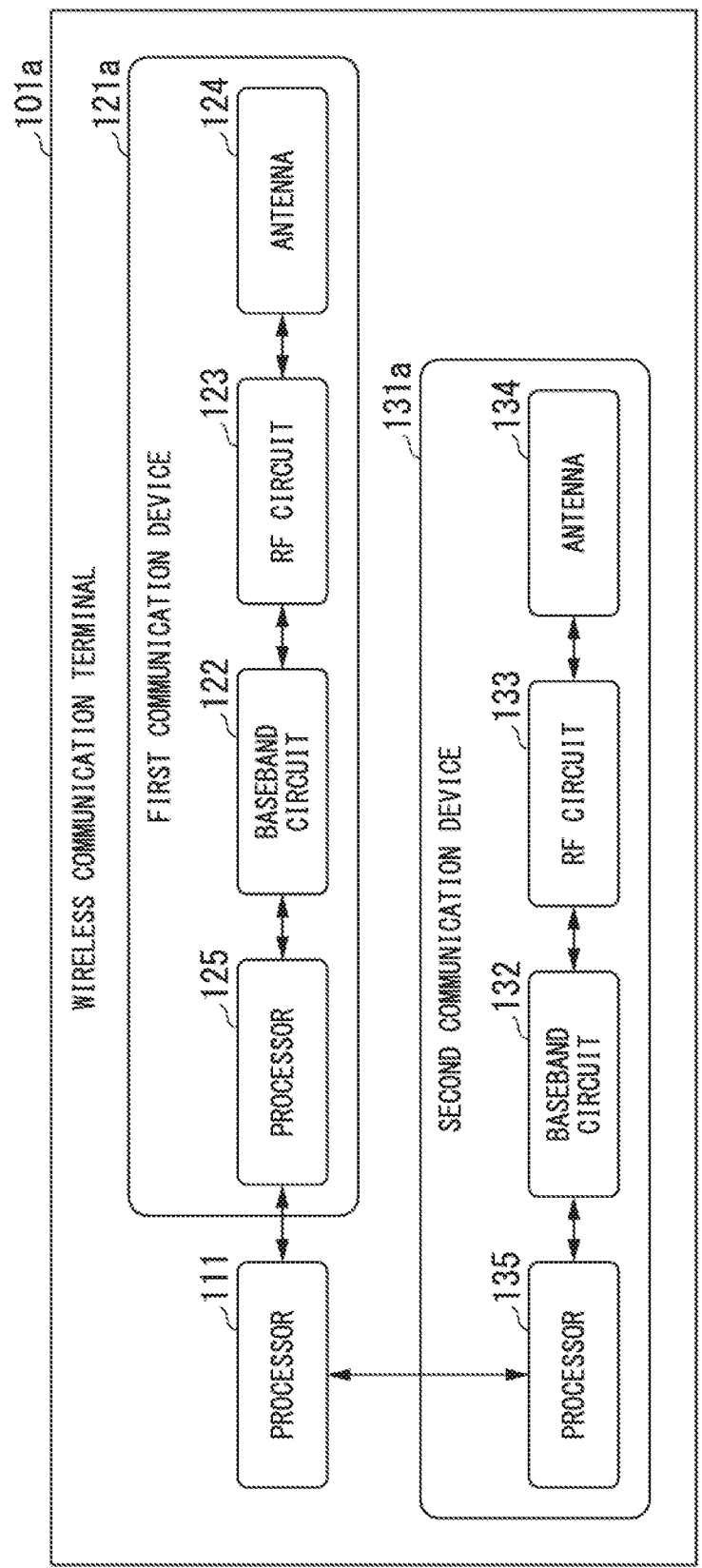
FIG. 6 is a block diagram showing a hardware configuration of a wireless communication terminal according to a modified example of the first embodiment of the present invention.

FIG. 6 shows a hardware configuration of a wireless communication terminal 101a according to a modified example of the first embodiment of the present invention. In terms of the configuration shown in FIG. 6, differences from the configuration shown in FIG. 2 will be described.

In the wireless communication terminal 101a, the first communication device 121 in the wireless communication terminal 101 shown in FIG. 2 is changed to a first communication device 121a and the second communication device 131 in the wireless communication terminal 101 shown in FIG. 2 is changed to a second communication device 131a. The first communication device 121a has a baseband circuit 122, an RF circuit 123, an antenna 124, and a processor 125. The processor 125 controls the baseband circuit 122. In the first communication device 121a, components other than the processor 125 are the same as those in the first communication device 121. The second communication device 131a has a baseband circuit 132, an RF circuit 133, an antenna 134, and a processor 135. The processor 135 controls the baseband circuit 132. In the second communication device 131a, components other than the processor 135 are the same as those in the second communication device 131. The processor 111 controls the processor 125 and the processor 135. The processor 111, the processor 125, and the processor 135 cooperate with each other to control wireless communication. In terms of points other than the above, the configuration shown in FIG. 6 is similar to the configuration shown in FIG. 2.

Only the first communication device 121a of the first and second communication devices 121a and 131a may be changed to the first communication device 121 shown in FIG. 2. Alternatively, only the second communication device 131a of the first and second communication devices 121a and 131a may be changed to the second communication device 131 shown in FIG. 2. In the external terminal 201, at least one of the third communication device 221 and the fourth communication device 231 may have a processor for controlling the baseband circuit.

Second Embodiment

A second embodiment of the present invention will be described using the wireless communication terminal 101 shown in FIG. 2 and the external terminal 201 shown in FIG. 3.

If the power supply of the first communication device 121 has been turned off in a state in which the second communication connection has been established between the second communication device 131 and the fourth communication device 231, the processor 111 maintains the second communication connection established between the second communication device 131 and the fourth communication device 231. If the processor 111 has received an instruction for turning on the power supply of the first communication device 121 when the power supply of the first communication device 121 is turned off, the processor 111 turns on the power supply of the first communication device 121.

Processing related to ON and OFF of the power supply is not shown. For example, a power-supply ON or OFF instruction is input by the user via the operation unit. If the power-supply OFF instruction is input via the operation unit, at least the power supply of the first communication device 121 is turned off and at least the power supply of the second communication device 131 is maintained in an ON state. For example, if the power-supply OFF instruction is input via the operation unit, the power supply of the configuration other than the second communication device 131 is turned off and only the power supply of the second communication device 131 is maintained in an ON state. If the power-supply OFF instruction is input via the operation unit, only the power supply of the first communication device 121 may be turned off and the power supply of the configuration other than the first communication device 121 may be maintained in an ON state.

If the amount of data communication performed by the first communication device 121 is less than or equal to a predetermined amount or if the wireless communication terminal 101 has transitioned from the first state to the second state, the processor 111 causes the first communication device 121 to stop an operation of the first mode. The power consumption of the wireless communication terminal 101 in the second state is controlled to be less than the power consumption of the wireless communication terminal 101 in the first state. When the first condition is satisfied and the second condition is not satisfied, the processor 111 transmits the instruction information to the fourth communication device 231 by the second communication device 131 after causing the first communication device 121 to operate in the first mode.

As described above, the first condition is a condition that the second communication connection based on the second communication protocol is established between the second communication device 131 and the fourth communication device 231. As described above, the second condition is a condition that the first communication device 121 is operating in the first mode. If the second communication connection is established and the first communication device 121 has stopped the operation of the first mode, the first communication device 121 starts the operation of the first mode. Thereafter, the instruction information is transmitted.

For example, when an active mode (a normal mode) is set in the wireless communication terminal 101, the wireless communication terminal 101 is in the first state. For example, when any one of a sleep mode, an idle mode, a suspend mode, a power saving mode, and a low power mode is set in the wireless communication terminal 101, the wireless communication terminal 101 is in the second state.

Figure 7:
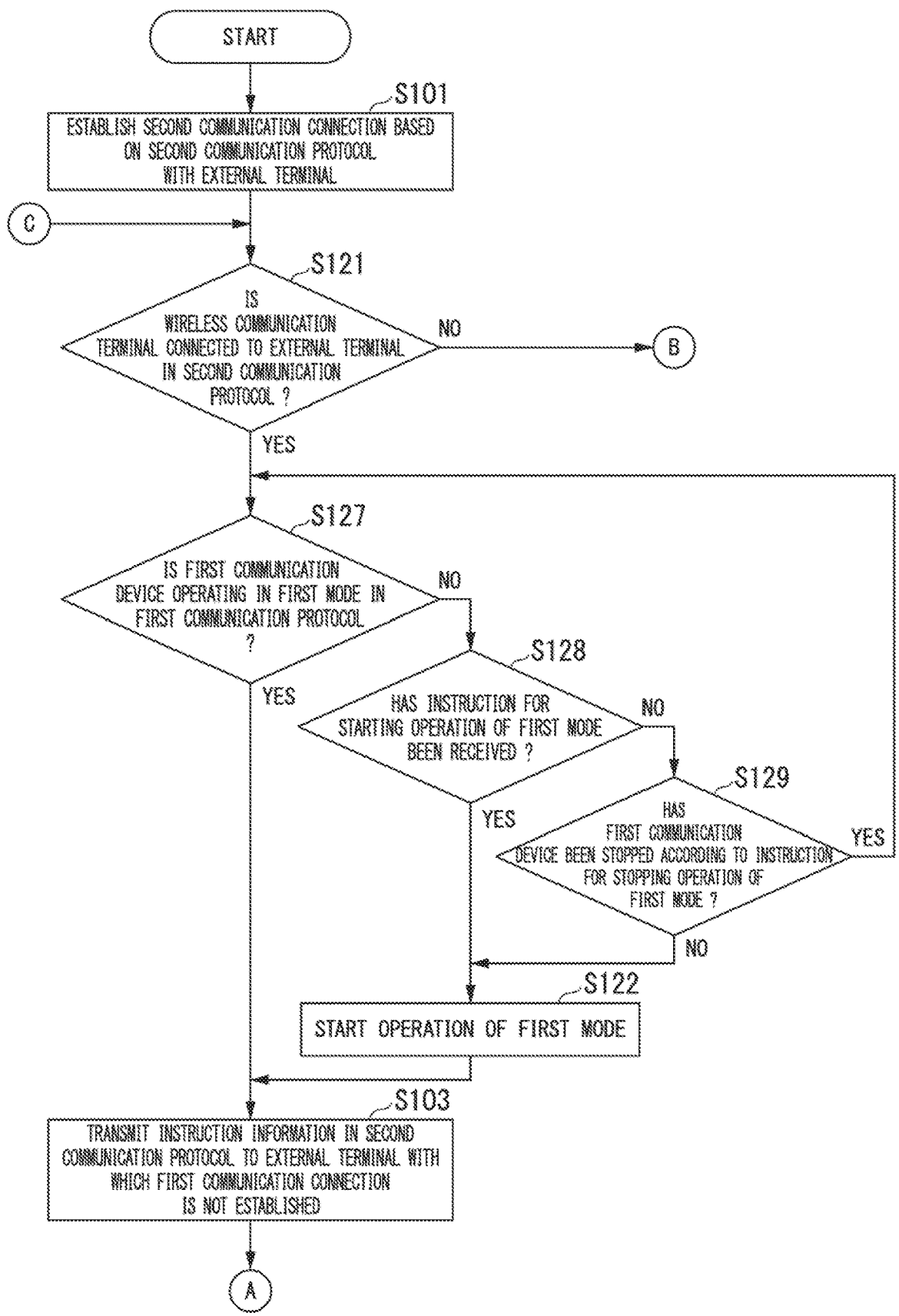
FIG. 7 is a flowchart showing a procedure of an operation of a wireless communication terminal according to a second embodiment of the present invention.
Figure 8:
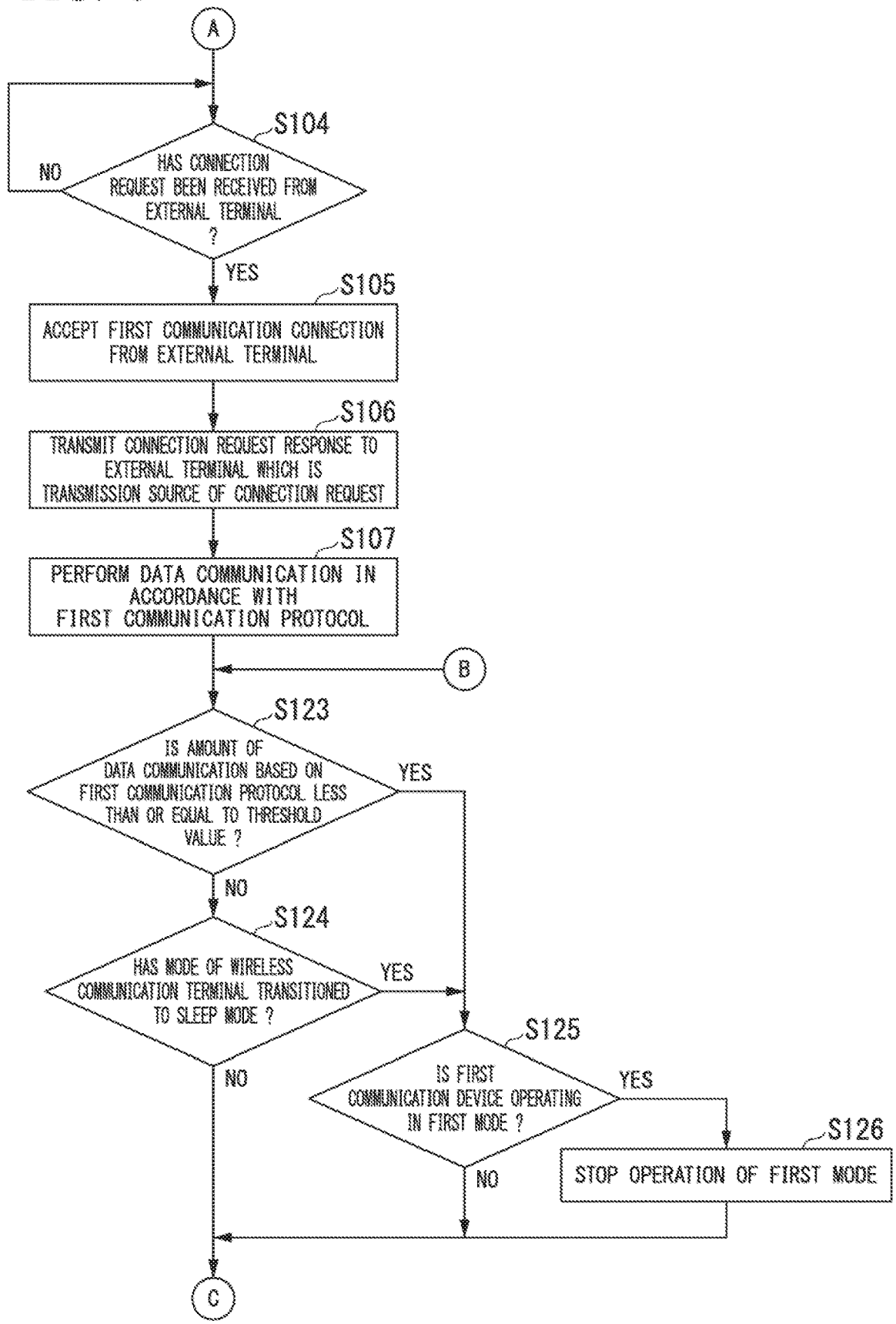
FIG. 8 is a flowchart showing a procedure of an operation of the wireless communication terminal according to the second embodiment of the present invention.

The operation of the wireless communication terminal 101 will be described. FIGS. 7 and 8 show the operation of the wireless communication terminal 101. When the power of the wireless communication terminal 101 is turned off and an instruction for turning on the power supply of the wireless communication terminal 101 is received, the process shown in FIGS. 7 and 8 is performed. In terms of the process shown in FIGS. 7 and 8, differences from the process shown in FIG. 4 will be described.

(Step S121)

After the second communication connection is established in step S101, the processor 111 asks the second communication device 131 about the state of the second communication connection. The state of the second communication connection is a connected state or a disconnected state. The connected state is a state in which the connection is maintained. That is, the connected state is a state in which the second communication device 131 and the fourth communication device 231 can perform data communication. The disconnected state is a state in which the second communication device 131 and the fourth communication device 231 are not connected. That is, the disconnected state is a state in which the second communication device 131 and the fourth communication device 231 cannot perform data communication. The second communication device 131 responds to the processor 111 with the state of the second communication connection. The processor 111 determines the state of the second communication connection on the basis of the response from the second communication device 131.

For example, if the distance between the wireless communication terminal 101 and the external terminal 201 increases and therefore the reception state in the wireless communication terminal 101 deteriorates, the second communication connection is disconnected. Alternatively, if an obstacle occurs between the wireless communication terminal 101 and the external terminal 201 and therefore the reception state deteriorates, the second communication connection is disconnected. Alternatively, if a process of a disconnection from the external terminal 201 has been performed, the second communication connection is disconnected. Alternatively, if an instruction for disconnecting the second communication connection or an instruction for stopping the second communication device 131 has been input via the operation unit, the second communication connection is disconnected.

If the processor 111 determines that the state of the second communication connection is the connected state, the processing of step S127 is performed. If the processor 111 determines that the state of the second communication connection is the disconnected state, the processing of step S123 is performed. If the state of the second communication connection is the disconnected state, the processor 111 may instruct the second communication device 131 to establish the second communication connection at any timing (not shown). Alternatively, after a message indicating that the second communication connection has been started is received from the fourth communication device 231 by the second communication device 131, the processor 111 may instruct the second communication device 131 to accept the connection.

(Step S127)

The processor 111 determines whether or not the first communication device 121 is operating in the first mode. For example, if the processor 111 has not once instructed the first communication device 121 to start the operation of the first mode, the processor 111 determines that the first communication device 121 is not operating in the first mode. On the other hand, if the processor 111 instructs the first communication device 121 to start the operation of the first mode one or more times and the processor 111 does not instruct the first communication device 121 to stop the operation of the first mode after the last instruction is given, the processor 111 makes the following determination. If the processor 111 has not received a notification for stopping the operation of the first mode from the first communication device 121, the processor 111 determines that the first communication device 121 is operating in the first mode. Otherwise, the processor 111 determines that the first communication device 121 is not operating in the first mode. For example, the processor 111 may ask the first communication device 121 about whether or not it is operating in the first mode. The processor 111 may determine whether or not the first communication device 121 is operating in the first mode on the basis of a response from the first communication device 121. If the processor 111 determines that the first communication device 121 is operating in the first mode, the processing of step S103 is performed. If the processor 111 determines that the first communication device 121 is not operating in the first mode, the processing of step S128 is performed.

(Step S128)

The processor 111 determines whether or not an instruction for starting the operation of the first mode has been received. For example, if an instruction for releasing the sleep mode and an instruction for transmitting data to the external terminal 201 are issued after the sleep mode is set in the wireless communication terminal 101, the processor 111 determines that the instruction for starting the operation of the first mode has been received. The instruction for releasing the sleep mode and the instruction for transmitting data to the external terminal 201 are input by the user via the operation unit. If the instruction for releasing the sleep mode has been issued, the processor 111 releases the setting of the sleep mode for the wireless communication terminal 101. As will be described below, if an instruction for transmitting data to the external terminal 201 has been issued after the setting of the sleep mode in the wireless communication terminal 101 due to a decrease in the amount of data communication, the processor 111 may determine that the instruction for starting the operation of the first mode has been received. If the second communication device 131 has received a message indicating a release of the sleep mode or a request for wireless communication in accordance with the first communication protocol after the setting of the sleep mode in the wireless communication terminal 101, the processor 111 may determine that the instruction for starting the operation of the first mode has been issued. If this message has been received, the processor 111 releases the setting of the sleep mode for the wireless communication terminal 101. If the processor 111 determines that the instruction of starting the operation of the first mode has been received, the processing of step S122 is performed. If the processor 111 determines that the instruction for starting the operation of the first mode has not been received, the processing of step S129 is performed.

(Step S129)

The processor 111 determines whether or not the first communication device 121 has been stopped in accordance with an instruction for stopping the operation of the first mode. This determination is based on the result of processing of step S126 to be described below. If the operation of the first mode has been stopped in the processing of step S126, the processor 111 determines that the first communication device 121 has been stopped in accordance with the instruction for stopping the operation of the first mode. At a timing immediately after the power supply of the wireless communication terminal 101 is turned on, the processor 111 determines that the first communication device 121 has not been stopped in accordance with the instruction for stopping the operation of the first mode. If the processor 111 determines that the first communication device 121 has been stopped in accordance with the instruction for stopping the operation of the first mode, the processing of step S127 is performed. If the processor 111 determines that the first communication device 121 has not been stopped in accordance with the instruction for stopping the operation of the first mode, the processing of step S122 is performed.

(Step S122)

The processor 111 causes the first communication device 121 to operate in the first mode. That is, the processor 111 instructs the first communication device 121 to start the operation of the first mode. The first communication device 121 starts the operation of the first mode. After the operation of the first mode is started, the processing of step S103 is performed. After the operation of the first mode is started, the processor ill may wait until the processor 111 receives a notification indicating that a state in which the first communication device 121 can accept the first communication connection from the external terminal 201 has been reached from the first communication device 121. After the processor 111 waits, the processing of step S103 may be performed. Alternatively, the processing of step S103 may be performed immediately without waiting for the processor 111 to receive the above-described notification.

If the instruction for starting the operation of the first mode has been received in step S128, the first communication device 121 has stopped the operation of the first mode. Alternatively, when the processing of step S129 is performed immediately after the power supply of the wireless communication terminal 101 is turned on, the first communication device 121 has stopped the operation of the first mode. That is, the second condition is not satisfied. On the other hand, as a result of the determination in step S121, the second communication connection has already been established between the second communication device 131 and the fourth communication device 231. That is, the first condition is satisfied. At this time, in the processing of step S122, the first communication device 121 starts the operation of the first mode.

(Step S123)

After the data communication is performed in step S107, the processor 111 determines whether or not the amount of the data communication in accordance with the first communication protocol is less than or equal to a threshold value. The threshold value is greater than or equal to 0. The threshold value may be 0. For example, the processor 111 determines whether or not the amount of data communication is less than or equal to 0 by determining whether or not data communication is completed. The processor 111 may determine that the amount of data communication is less than or equal to the threshold value at the moment when the amount of data communication becomes less than or equal to the threshold value. Alternatively, if the state in which the amount of data communication is less than or equal to the threshold value continues for a predetermined time, the processor 111 may determine that the amount of data communication is less than or equal to the threshold value. When the processor 111 determines that the amount of data communication in accordance with the first communication protocol is less than or equal to the threshold value, the processing of step S125 is performed. When the processor 111 determines that the amount of data communication in accordance with the first communication protocol is greater than the threshold value, the processing of step S124 is performed.

(Step S124)

The processor 111 determines whether or not the mode of the wireless communication terminal 101 has transitioned to the sleep mode. For example, if an instruction for transition to the sleep mode has been input by the user via the operation unit, the mode of the wireless communication terminal 101 transitions to the sleep mode. The mode of the wireless communication terminal 101 may transition to the sleep mode if the operation unit has not operated for a fixed time. Time at which the transition to the sleep mode is performed may be set by the user via the operation unit and the mode of the wireless communication terminal 101 may transition to the sleep mode when the set time has been reached. If the first communication device 121, the second communication device 131, or another communication device (not shown) has received an instruction from the external terminal 201, the mode of the wireless communication terminal 101 may transition to the sleep mode. The processor 111 controls the entire wireless communication terminal 101 so that the power consumption of the wireless communication terminal 101 in the sleep mode is less than the power consumption of the wireless communication terminal 101 in the active mode (the normal mode). If the processor 111 determines that the mode of the wireless communication terminal 101 has transitioned to the sleep mode, the processing of step S125 is performed. If the processor 111 determines that the mode of the wireless communication terminal 101 has not transitioned to the sleep mode, the processing of step S121 is performed.

(Step S125)

The processor 111 determines whether or not the first communication device 121 is operating in the first mode. This processing is similar to the processing of step S127. If the processor 111 determines that the first communication device 121 is operating in the first mode, the processing of step S126 is performed. If the processor 111 determines that the first communication device 121 is not operating in the first mode, the processing of step S121 is performed.

(Step S126)

The processor 111 causes the first communication device 121 to stop the operation of the first mode. That is, the processor 111 instructs the first communication device 121 to stop the operation of the first mode. The first communication device 121 stops the operation of the first mode. After the operation of the first mode is stopped, the processing of step S121 is performed.

In terms of points other than the above, the process shown in FIGS. 7 and 8 is similar to the process shown in FIG. 4.

In the operation shown in FIGS. 7 and 8, if the amount of data communication performed by the first communication device 121 is less than a predetermined amount (step S123) or if the wireless communication terminal 101 has transitioned from the first state to the second state (step S124), the processor 111 causes the first communication device 121 to stop the operation of the first mode (step S126). If the first condition is satisfied and the second condition is not satisfied, the processor 111 causes the first communication device 121 to operate in the first mode (step S122). Thereafter, the processor 111 transmits instruction information to the fourth communication device 231 by the second communication device 131 (step S103).

In the operation shown in FIGS. 7 and 8, the processing of either one of steps S123 and S124 need not be performed. For example, if the processor 111 determines that the amount of data communication in accordance with the first communication protocol is greater than the threshold value in step S123, the processing of step S124 is not performed and the processing of step S121 may be performed. Alternatively, after the processing of step S107 is performed, the processing of step S123 is not performed and the processing of step S124 may be performed.

Figure 9:
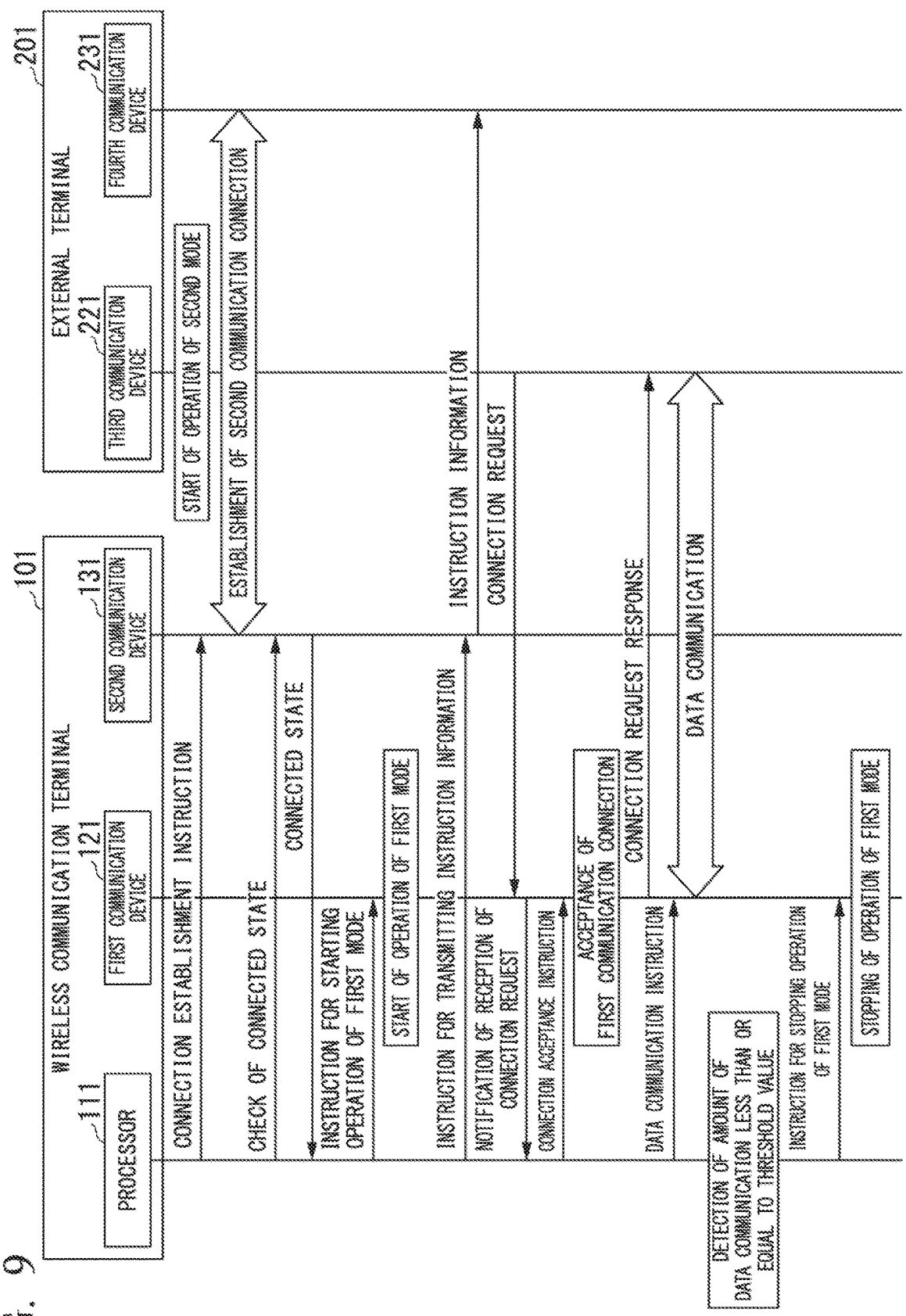
FIG. 9 is a sequence diagram showing a communication procedure in the second embodiment of the present invention.

FIG. 9 shows a procedure of communication between the wireless communication terminal 101 and the external terminal 201. In terms of the operation shown in FIG. 9, differences from the operation shown in FIG. 5 will be described.

An operation until the second communication connection is established by the second communication device 131 and the fourth communication device 231 is similar to the operation shown in FIG. 5. After the second communication connection is started, the state of the second communication connection is a connected state (step S121) and the first communication device 121 is not operating in the first mode (step S127). Further, the instruction for starting the operation of the first mode has not been received (step S128), and the operation of the first mode has not been stopped (step S129) in the processing of step S126. Therefore, the processor 111 instructs the first communication device 121 to start the operation of the first mode (step S122). The first communication device 121 starts the operation of the first mode (step S122).

An operation until the data communication starts after the operation of the first mode is started by the first communication device 121 is similar to the operation shown in FIG. 5. After the data communication is performed, the processor 111 detects the amount of data communication less than or equal to the threshold value (step S123). In the operation shown in FIG. 9, the processor 111 detects the amount of data communication less than or equal to the threshold value by monitoring the amount of data communication performed by the first communication device 121. The first communication device 121 may monitor the amount of data communication. The first communication device 121 may issue a notification to the processor 111 when the amount of data communication less than or equal to the threshold value is detected.

When the amount of data communication less than or equal to the threshold value has been detected, the first communication device 121 is operating in the first mode (step S125). Thus, the processor 111 instructs the first communication device 121 to stop the operation of the first mode (step S126). The first communication device 121 stops the operation of the first mode (step S126).

In terms of points other than the above, the operation shown in FIG. 9 is similar to the operation shown in FIG. 5.

The wireless communication terminal 101a shown in FIG. 6 may operate as in the wireless communication terminal 101 of the second embodiment.

As described above, even when the first communication device 121 has stopped the operation of the first mode, instruction information is transmitted after the processor 111 causes the first communication device 121 to start the operation of the first mode. Thus, the wireless communication terminal 101 can be wirelessly connected to the external terminal 201 in accordance with the first communication protocol on the basis of a trigger from the wireless communication terminal 101.

Third Embodiment

Figure 10:
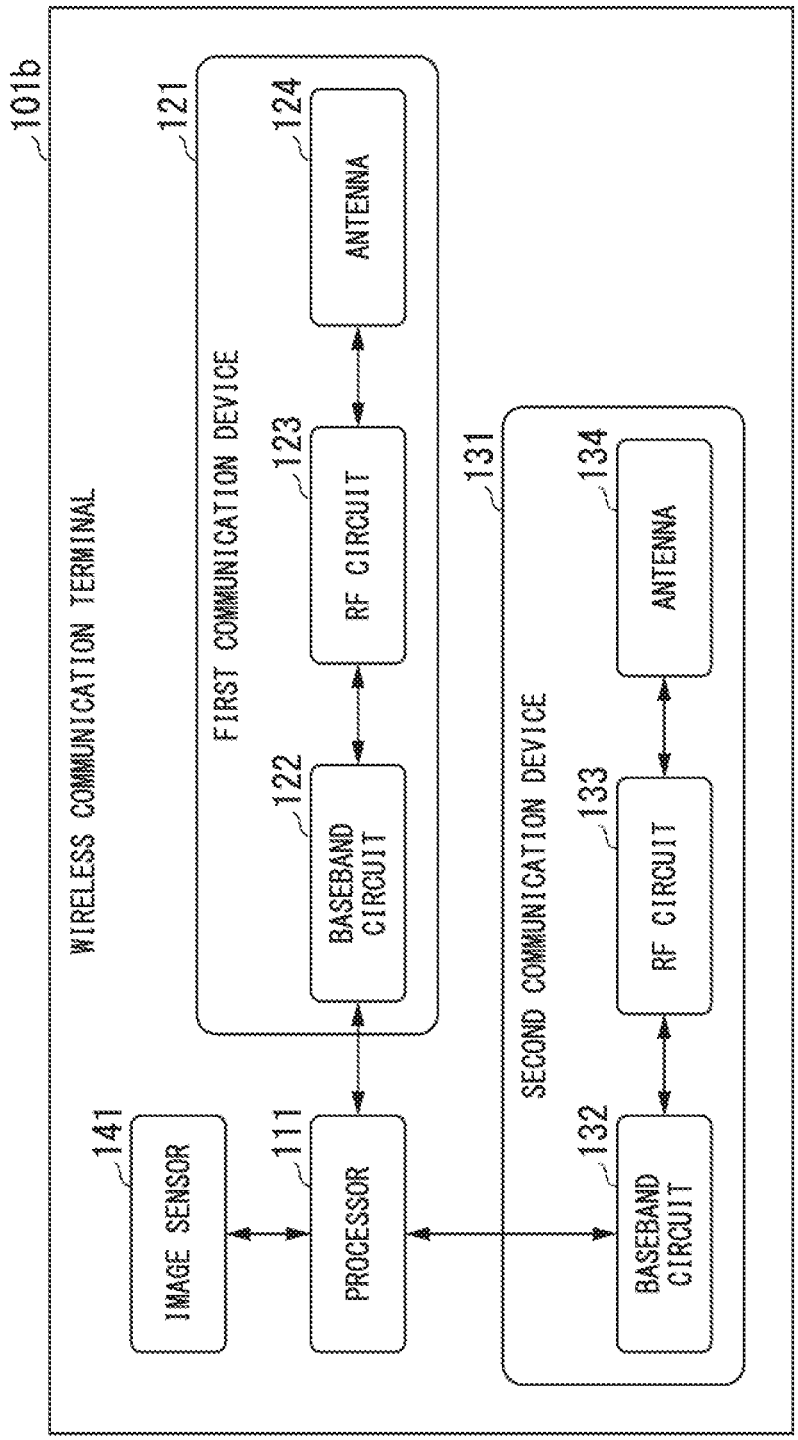
FIG. 10 is a block diagram showing a hardware configuration of a wireless communication terminal according to a third embodiment of the present invention.

FIG. 10 shows a hardware configuration of the wireless communication terminal 101b according to a third embodiment of the present invention. In terms of the configuration shown in FIG. 10, differences from the configuration shown in FIG. 2 will be described.

The wireless communication terminal 101b includes an image sensor 141 (an imaging element) in addition to the configuration of the wireless communication terminal 101 shown in FIG. 2. The image sensor 141 generates an imaging signal by performing imaging. The imaging signal generated by the image sensor 141 is converted into image data by an A/D converter which is not shown in FIG. 2. The image sensor 141 may have the A/D converter and the image sensor 141 may generate image data.

The wireless communication terminal 101b can operate in a third mode (an imaging transfer mode). The third mode is a mode in which the image data generated by the image sensor 141 performing imaging is transmitted to the external terminal 201. The processor 111 determines whether or not the third mode has been set in the wireless communication terminal 101b. When the first condition, the second condition, and the third condition are satisfied, the processor 111 transmits the instruction information to the fourth communication device 231 by the second communication device 131. The third condition is a condition that the processor 111 determines that the third mode has been set in the wireless communication terminal 101b.

As described above, the first condition is a condition that the second communication connection based on the second communication protocol is established between the second communication device 131 and the fourth communication device 231. As described above, the second condition is a condition that the first communication device 121 is operating in the first mode. If the second communication connection is established, the first communication device 121 performs the operation of the first mode, and the third mode is set in the wireless communication terminal 101*b*, the instruction information is transmitted.

In data communication after the third mode is set in the wireless communication terminal 101*b*, the processor 111 transmits the image data to the third communication device 221 by the first communication device 121. The third communication device 221 receives the image data from the first communication device 121.

The processor 111 determines the state of the first communication connection between the first communication device 121 and the third communication device 221. The state of the first communication connection is one of a connected state and a disconnected state. When the first condition, the second condition, the third condition, and the fourth condition are satisfied, the processor 111 transmits the instruction information to the fourth communication device 231 by the second communication device 131. The fourth condition is a condition that the state of the first communication connection is the disconnected state. A timing when the instruction information is transmitted is a timing when the processor 111 determines the third mode has been set in the wireless communication terminal 101*b* or a timing when the image sensor 141 performs imaging.

If the second communication connection is established, the first communication device 121 performs the operation of the first mode, the third mode is set in the wireless communication terminal 101*b*, and the state of the first communication connection is the disconnected state, the instruction information is transmitted. For example, a timing when the instruction information is transmitted is a timing when the processor 111 determines that the third mode has already been set in the wireless communication terminal 101*b*. The timing when the instruction information is transmitted may be a timing when an instruction for setting the third mode has been received. The timing when the instruction information is transmitted may be a timing when the processor 111 determines that the image sensor 141 has performed imaging. In terms of points other than the above, the configuration shown in FIG. 10 is similar to the configuration shown in FIG. 2.

Figure 11:
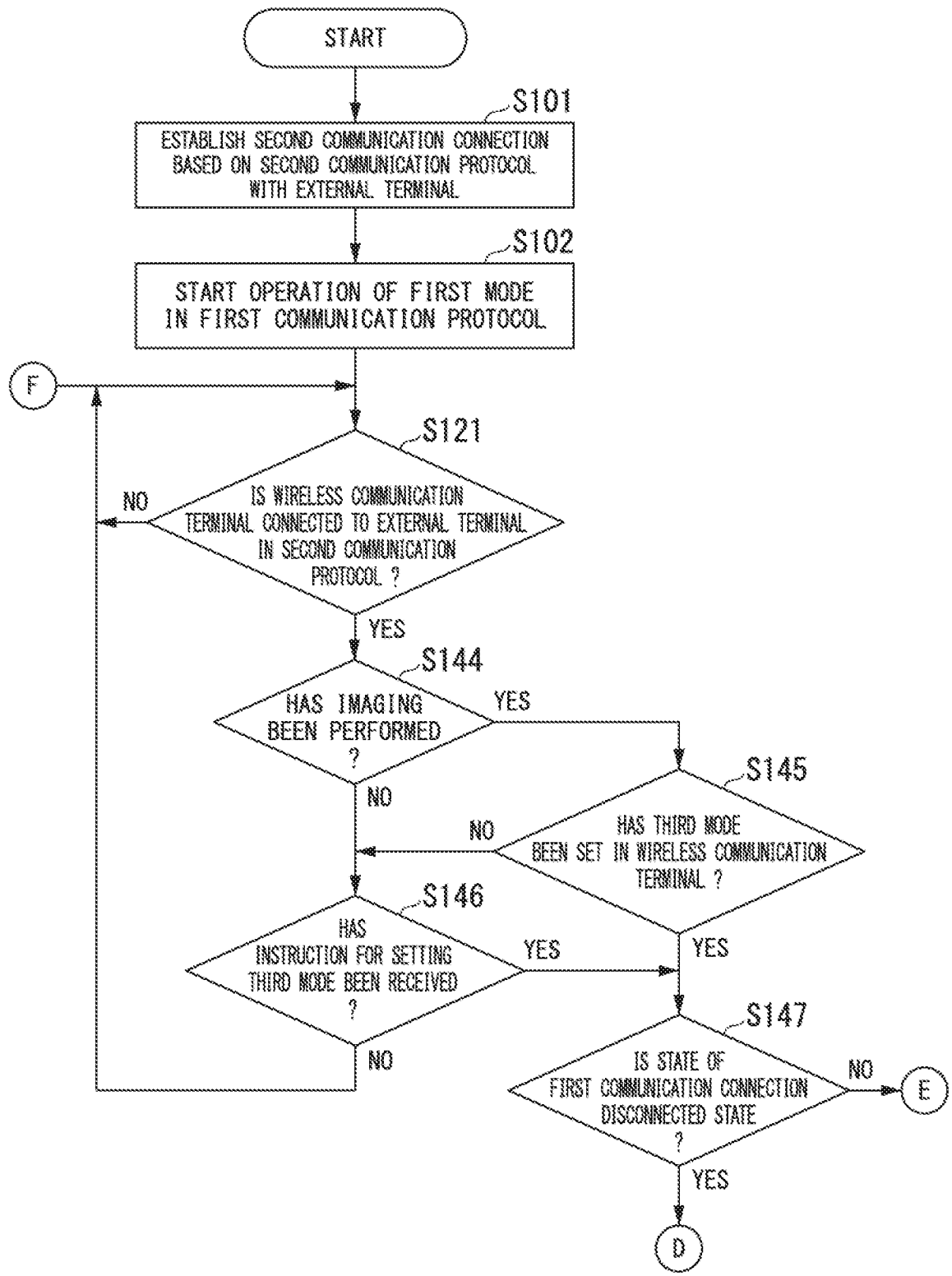
FIG. 11 is a flowchart showing a procedure of an operation of a wireless communication terminal according to the third embodiment of the present invention.
Figure 12:
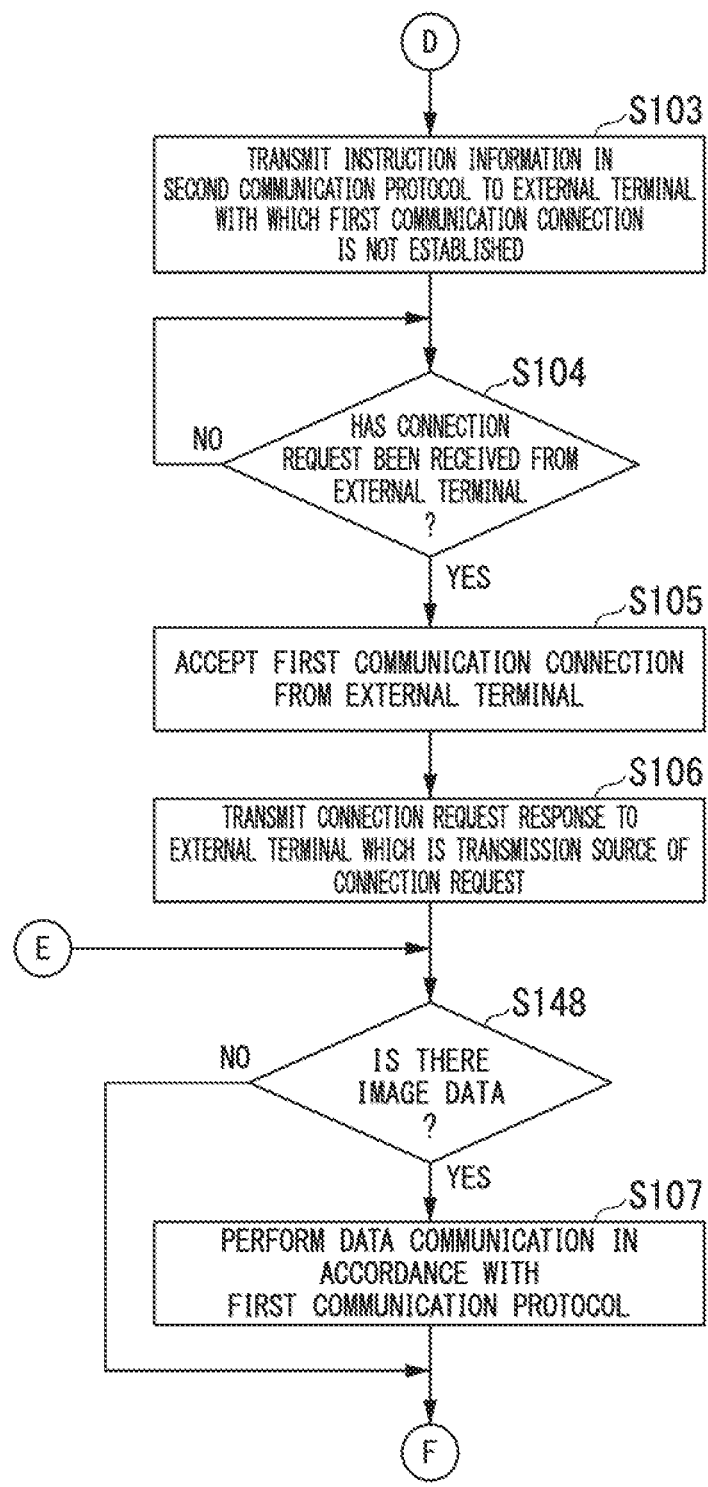
FIG. 12 is a flowchart showing a procedure of an operation of the wireless communication terminal according to the third embodiment of the present invention.

The operation of the wireless communication terminal 101*b* will be described. FIGS. 11 and 12 show the operation of the wireless communication terminal 101*b*. In terms of the process shown in FIGS. 11 and 12, differences from the process shown in FIG. 4 will be described.

(Step S121)

After the first communication device 121 starts the operation of the first mode in step S102, the processor 111 determines the state of the second communication connection. This processing is similar to the processing of step S121 shown in FIG. 7. If the processor 111 determines that the state of the second communication connection is the connected state, the processing of step S144 is performed. If the processor 111 determines that the state of the second communication connection is the disconnected state, the processing of step S121 is iterated until the state of the second communication connection transitions to the connected state.

(Step S144)

The processor 111 determines whether or not imaging has been performed by the image sensor 141. For example, if the image sensor 141 has performed imaging, the image sensor 141 notifies the processor 111 of execution of the imaging. If the image sensor 141 has notified the processor 111 of the execution of the imaging, the processor 111 determines that the imaging has been performed by the image sensor 141. Otherwise, the processor 111 determines that the imaging has not been performed by the image sensor 141. If the processor 111 determines that the imaging has been performed by the image sensor 141, the processing of step S145 is performed. If the processor 111 determines that the imaging has not been performed by the image sensor 141, the processing of step S146 is performed.

(Step S145)

The processor 111 determines whether or not the third mode has been set in the wireless communication terminal 101*b*. That is, the processor 111 determines whether or not the wireless communication terminal 101*b* is operating in the third mode. If the processor 111 determines that the third mode has been set in the wireless communication terminal 101*b*, the processing of step S147 is performed. In this case, the third condition is satisfied. If the processor 111 determines that the third mode has not been set in the wireless communication terminal 101*b*, the processing of step S146 is performed.

(Step S146)

The processor 111 determines whether or not an instruction for setting the third mode has been received. For example, the instruction for setting the third mode is input by the user via the operation unit. For example, when a key or a button is operated on a GUI, the instruction for setting the third mode is input. The instruction for setting the third mode may be input by operating the touch panel. The instruction for setting the third mode may be input by operating a dedicated button or a mode dial of the third mode. The instruction for setting the third mode may be received if the first communication device 121, the second communication device 131, or another communication device (not shown) has received the instruction from the external terminal 201. If the processor 111 determines that the instruction for setting the third mode has been received, the processing of step S147 is performed. On the basis of receiving the instruction for setting the third mode, the processor 111 sets the third mode in the wireless communication terminal 101*b*. If the processor 111 determines that the instruction for setting the third mode has not been received, the process of step S121 is performed.

(Step S147)

The processor 111 asks the first communication device 121 about the state of the first communication connection. The first communication device 121 responds to the processor 111 with the state of the first communication connection. The processor 111 determines the state of the first communication connection on the basis of the response from the first communication device 121. If the processor 111 determines that the state of the first communication connection is the disconnected state, the processing of step S103 is performed. In this case, the fourth condition is satisfied. If the processor 111 determines that the state of the first communication connection is not the disconnected state, the processing of step S148 is performed.

(Step S148)

After the connection request response is transmitted in step S106, the processor 111 determines whether or not there is image data capable of being transmitted to the external terminal 201. For example, the processor 111 determines whether or not the image data generated through the imaging performed by the image sensor 141 has been stored in a buffer which is not shown in FIG. 10. If the processor 111 determines that there is image data capable of being transmitted to the external terminal 201, the processing of step S107 is performed. If the processor 111 determines that there is no image data capable of being transmitted to the external terminal 201, the processing of step S121 is performed.

In step S107, the processor 111 transmits the image data to the third communication device 221 by the first communication device 121. That is, the processor 111 instructs the first communication device 121 to perform data communication. The first communication device 121 transmits the image data to the third communication device 221.

In terms of points other than the above, the process shown in FIGS. 11 and 12 is similar to the process shown in FIG. 4.

In the operation shown in FIGS. 11 and 12, the processor 111 determines whether or not the third mode has been set in the wireless communication terminal 101b (steps S145 and S146). When the first condition, the second condition, and the third condition are satisfied, the processor 111 transmits the instruction information to the fourth communication device 231 by the second communication device 131 (step S103).

In the operation shown in FIGS. 11 and 12, the processor 111 determines the state of the first communication connection between the first communication device 121 and the third communication device 221 (step S147). When the first condition, the second condition, the third condition, and the fourth condition are satisfied, the processor 111 transmits the instruction information to the fourth communication device 231 by the second communication device 131 (step S103). The instruction information is transmitted at a timing when the processor 111 determines that the third mode has been set in the wireless communication terminal 101b (steps S145 and S146) or a timing when the image sensor 141 performs imaging (step S144).

Figure 13:
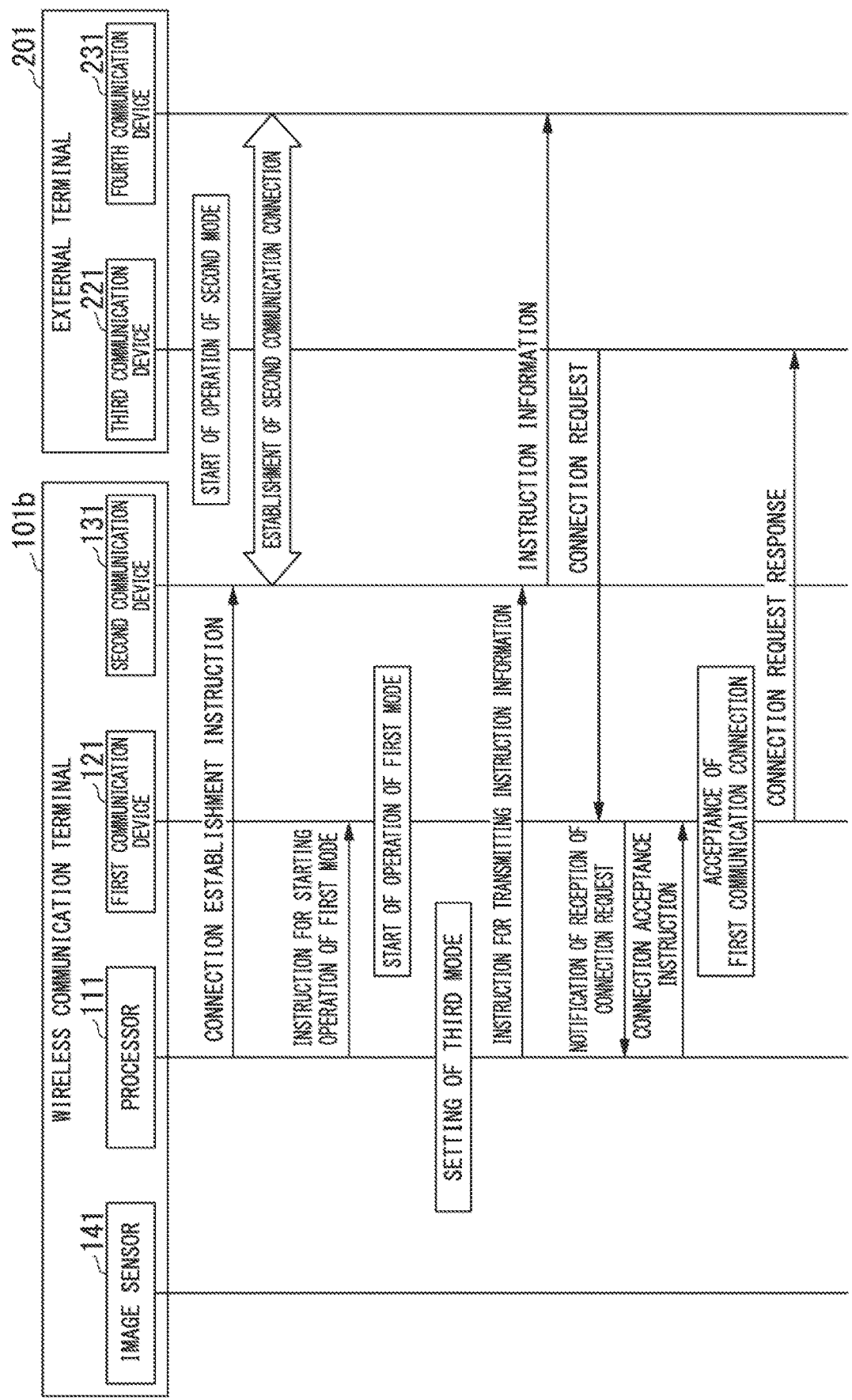
FIG. 13 is a sequence diagram showing a communication procedure in the third embodiment of the present invention.
Figure 14:
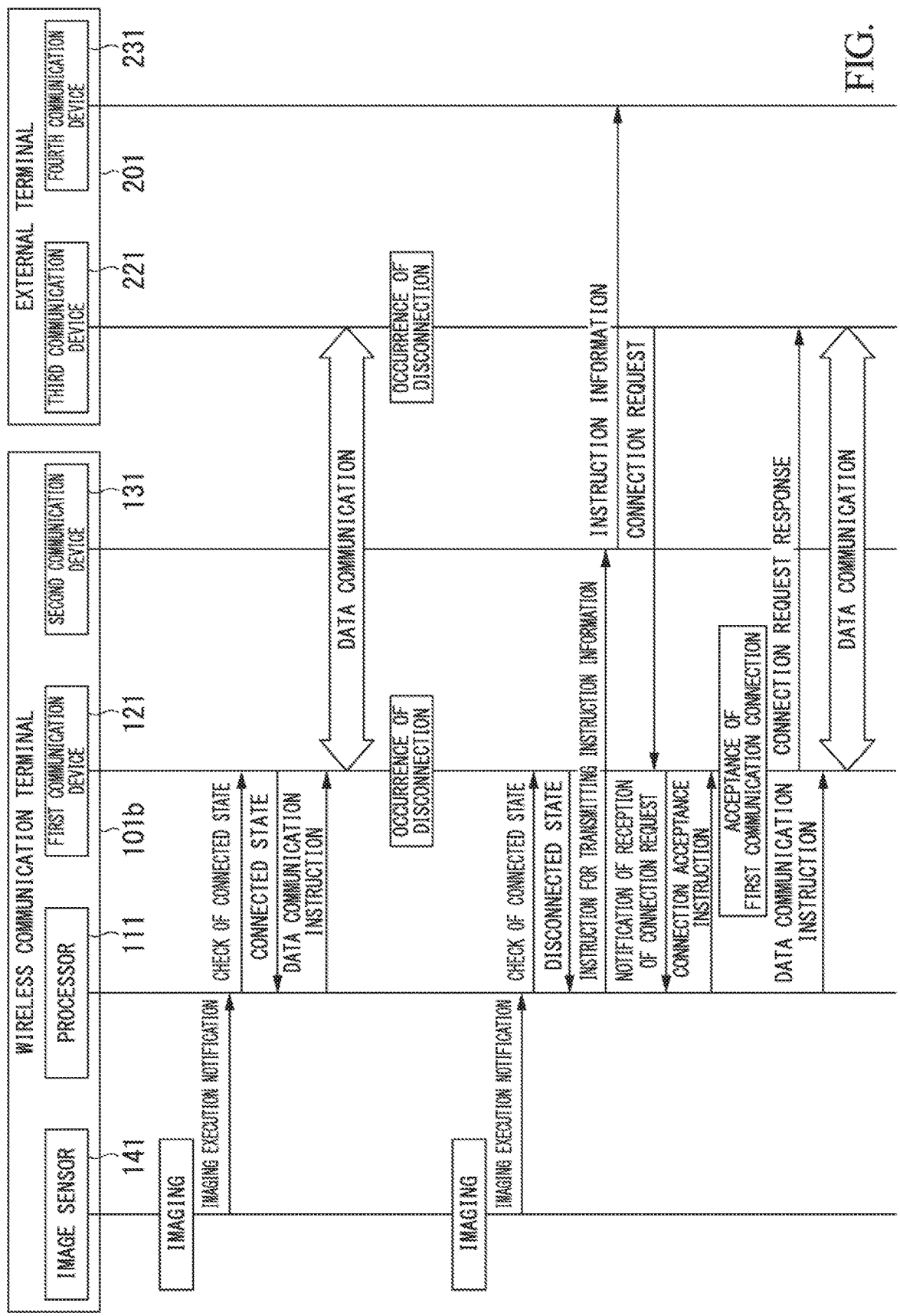
FIG. 14 is a sequence diagram showing a communication procedure in the third embodiment of the present invention.

FIGS. 13 and 14 show a procedure of communication between the wireless communication terminal 101b and the external terminal 201. After the communication shown in FIG. 13 is performed, the communication shown in FIG. 14 is performed. In terms of the operation shown in FIGS. 13 and 14, differences from the operation shown in FIG. 5 will be described.

An operation until the second communication connection is established by the second communication device 131 and the fourth communication device 231 is similar to the operation shown in FIG. 5. After the second communication connection is started, the state of the second communication connection is the connected state (step S121) and imaging is not performed by the image sensor 141 (step S144). Thereafter, the third mode is set in the wireless communication terminal 101b (step S146). The state of the first communication connection is the disconnected state (step S147). Thus, the processor 111 instructs the second communication device 131 to transmit the instruction information (step S103). The second communication device 131 transmits the instruction information to the fourth communication device 231 (step S103).

An operation until the connection request response is transmitted after the instruction information is transmitted is similar to the operation shown in FIG. 5. Because imaging is not performed by the image sensor 141, there is no image data capable of being transmitted to the external terminal 201 (step S148). Thus, data communication is not performed. The state of the second communication connection is the connected state (step S121). After the connection request response is transmitted, the image sensor 141 performs first imaging. The image sensor 141 notifies the processor 111 of execution of imaging (step S144). At this time, the third mode has already been set in the wireless communication terminal 10b (step S145).

The processor 111 checks the state of the first communication connection by asking the first communication device 121 about the state of the first communication connection (step S147). The first communication device 121 responds to the processor 111 with the state of the first communication connection which is the connected state (step S147). There is image data capable of being transmitted to the external terminal 201 on account of the first imaging by the image sensor 141 (step S148). Thus, the processor 111 instructs the first communication device 121 to perform data communication (step S107). The first communication device 121 performs data communication with the third communication device 221 (step S107).

Thereafter, a disconnection occurs in the first communication connection due to any reason. For example, the disconnection is caused due to deterioration of a radio wave state. Alternatively, if the external terminal 201 enters the power saving state when a predetermined time has elapsed in the external terminal 201, the disconnection occurs. The state of the second communication connection is the connected state (step S121). After the disconnection is caused, the image sensor 141 performs second imaging. The image sensor 141 notifies the processor 111 of execution of imaging (step S144). At this time, the third mode has already been set in the wireless communication terminal 101b (step S145).

The processor 111 checks the state of the first communication connection by asking the first communication device 121 about the state of the first communication connection (step S147). The first communication device 121 responds to the processor 111 with the state of the first communication connection which is the disconnected state (step S147). Because the state of the first communication connection is the disconnected state, the processor 111 instructs the second communication device 131 to transmit the instruction information (step S103). The second communication device 131 transmits the instruction information to the fourth communication device 231 (step S103).

An operation until the connection request response is transmitted after the instruction information is transmitted is similar to the operation shown in FIG. 5. According to the second imaging by the image sensor 141, there is image data capable of being transmitted to the external terminal 201 (step S148). Thus, the processor 111 instructs the first communication device 121 to perform data communication (step S107). The first communication device 121 performs data communication with the third communication device 221 (step S107).

In terms of points other than the above, the operation shown in FIGS. 13 and 14 is similar to the operation shown in FIG. 5.

As described above, if the first communication device 121 is operating in the first mode, the instruction information is transmitted at a timing when the processor 111 determines that the third mode has already been set in the wireless communication terminal 101b. Alternatively, if the first communication device 121 is operating in the first mode, the instruction information is transmitted at a timing when the setting instruction of the third mode has been received. Alternatively, if the first communication device 121 is operating in the first mode, the instruction information is transmitted at a timing when the image sensor 141 performs imaging. Thus, the wireless communication terminal 101b can establish the first communication connection at the timing related to the setting of the third mode or the timing when imaging is performed. Also, when imaging is performed by the image sensor 141, the wireless communication terminal 101b can immediately transfer the image data to the external terminal 201.

After the first communication connection is established at a timing related to the setting of the third mode, the state of the first communication connection may become the disconnected state due to any reason. However, if the operation of the third mode is continuously performed, imaging is performed by the image sensor 141, so that the first communication connection is established. Furthermore, the wireless communication terminal 101b can immediately transfer the image data to the external terminal 201. Therefore, when the imaging is performed in the wireless communication terminal 101b, the wireless communication terminal 101b can be wirelessly connected to the external terminal 201 in accordance with the first communication protocol.

Modified Example of Third Embodiment

Figure 15:
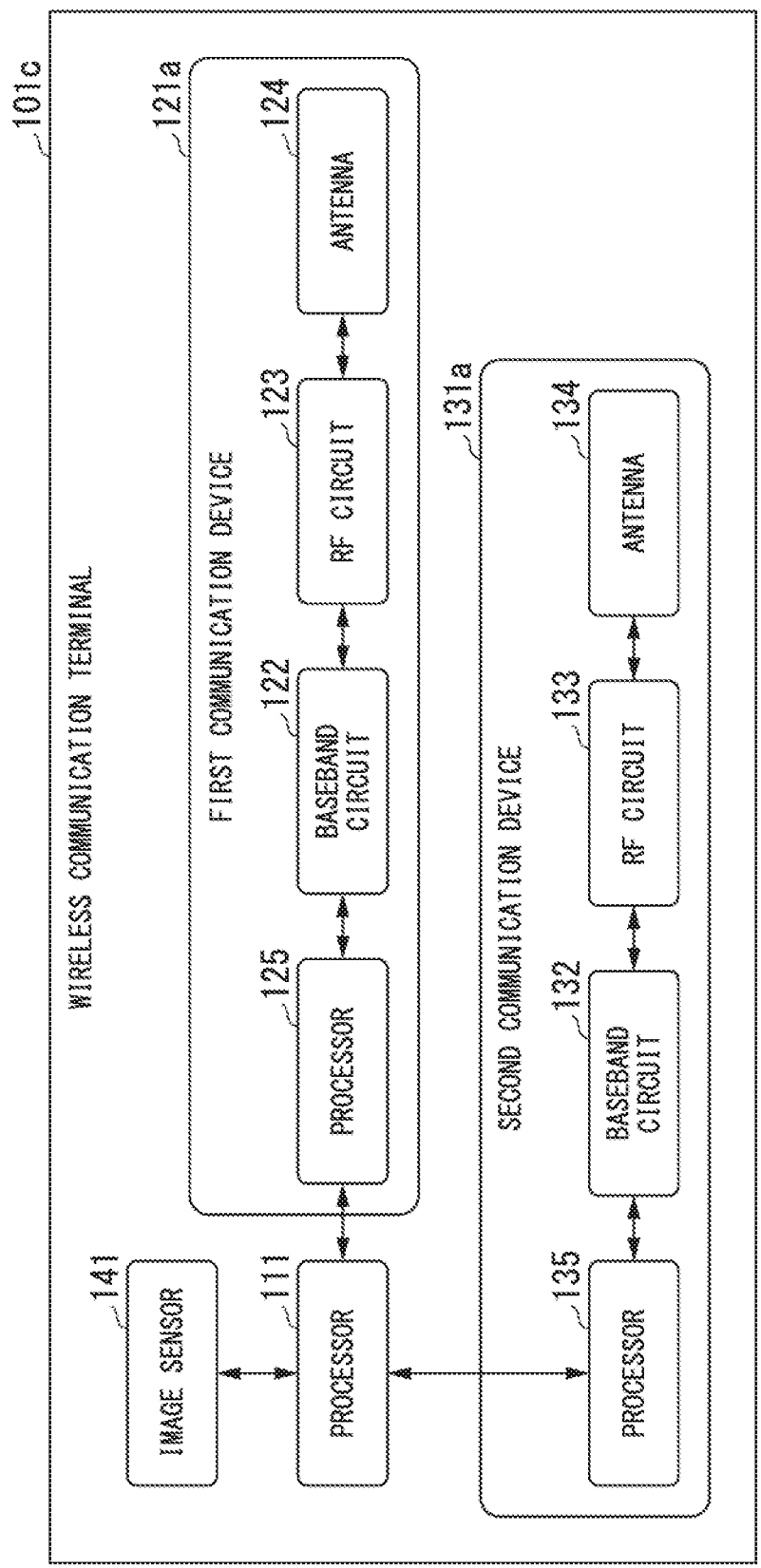
FIG. 15 is a block diagram showing a hardware configuration of a wireless communication terminal according to a modified example of the third embodiment of the present invention.

FIG. 15 shows a hardware configuration of a wireless communication terminal 101c according to a modified example of the third embodiment of the present invention. In terms of the configuration shown in FIG. 15, differences from the configuration shown in FIG. 10 will be described.

In the wireless communication terminal 101c, the first communication device 121 in the wireless communication terminal 101b shown in FIG. 10 is changed to a first communication device 121a and the second communication device 131 in the wireless communication terminal 101b shown in FIG. 10 is changed to a second communication device 131a. The first communication device 121a is the same as the first communication device 121a in the wireless communication terminal 101a shown in FIG. 6. The second communication device 131a is the same as the second communication device 131a in the wireless communication terminal 101a shown in FIG. 6. In terms of points other than the above, the configuration shown in FIG. 15 is similar to the configuration shown in FIG. 10.

Only the first communication device 121a of the first and second communication devices 121a and 131a may be changed to the first communication device 121 shown in FIG. 10. Alternatively, only the second communication device 131a of the first and second communication devices 121a and 131a may be changed to the second communication device 131 shown in FIG. 10.

Fourth Embodiment

A fourth embodiment of the present invention will be described using the wireless communication terminal 101b shown in FIG. 10 and the external terminal 201 shown in FIG. 3.

If the amount of data communication performed by the first communication device 121 is less than or equal to a predetermined amount or if the wireless communication terminal 101b has transitioned from the first state to the second state, the processor 111 causes the first communication device 121 to stop the operation of the first mode. The power consumption of the wireless communication terminal 101b in the second state is controlled to be less than the power consumption of the wireless communication terminal 101b in the first state. If the first condition and the third condition are satisfied and the second condition is not satisfied, the processor 111 causes the first communication device 121 to operate in the first mode and then transmits the instruction information to the fourth communication device 231 by the second communication device 131. A timing when the instruction information is transmitted is a timing when the processor 111 determines that the third mode has been set in the wireless communication terminal 101b or a timing when the image sensor 141 performs imaging. As described above, the first condition is a condition that the second communication connection based on the second communication protocol is established between the second communication device 131 and the fourth communication device 231. As described above, the second condition is a condition that the first communication device 121 is operating in the first mode. As described above, the third condition is a condition that the processor 111 determines that the third mode has been set in the wireless communication terminal 101b.

If the second communication connection is established, the first communication device 121 stops the operation in the first mode, and the third mode is set in the wireless communication terminal 101b, the first communication device 121 starts the operation of the first mode. Thereafter, instruction information is transmitted.

Figure 16:
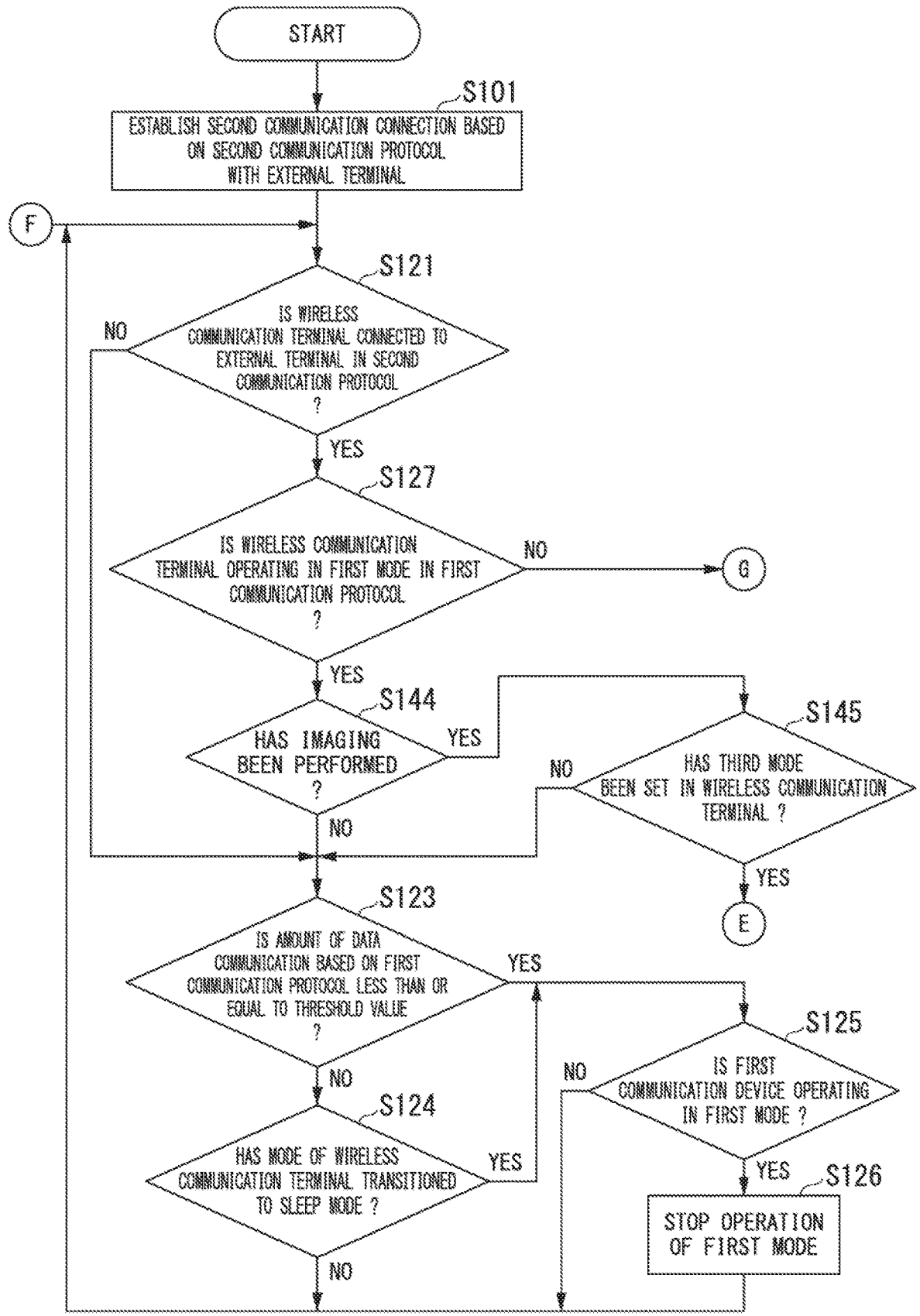
FIG. 16 is a flowchart showing a procedure of an operation of the wireless communication terminal according to a fourth embodiment of the present invention.
Figure 17:
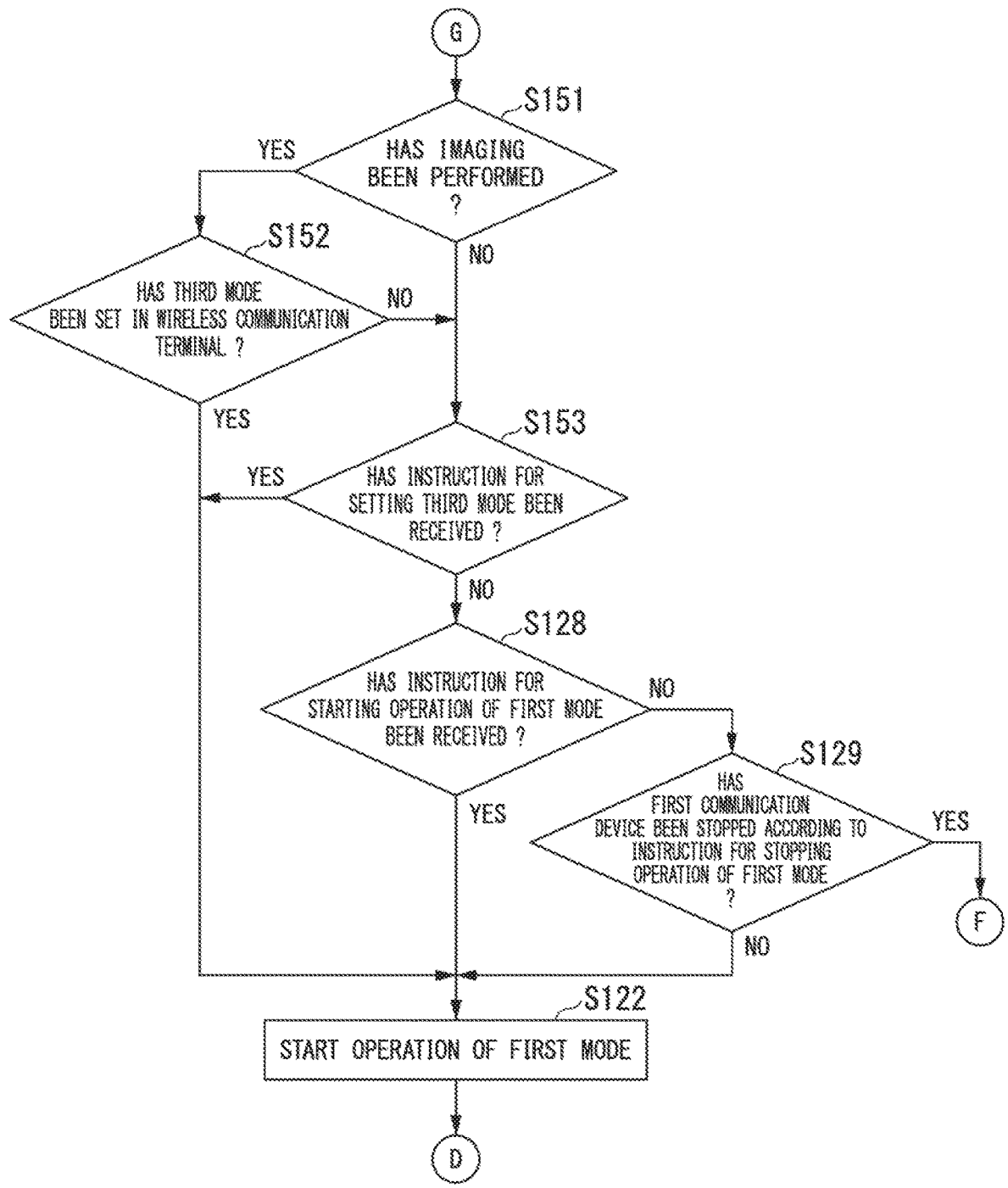
FIG. 17 is a flowchart showing a procedure of an operation of the wireless communication terminal according to the fourth embodiment of the present invention.

The operation of the wireless communication terminal 101b will be described. FIGS. 16 and 17 show the operation of the wireless communication terminal 101b. The process shown in FIG. 11 in the third embodiment is changed to the process shown in FIGS. 16 and 17. The process shown in FIG. 12 in the third embodiment is also similar to that in the fourth embodiment. In terms of the process shown in FIGS. 16 and 17, differences of the process shown in FIG. 11 will be described.

After the processing of step S101 is performed, the processing of step S102 is not performed and the processing of step S121 is performed. In step S121, if the processor 111 determines that the state of the second communication connection is the disconnected state, the processing of step S123 is performed. The processing of steps S123 to S126 is the same as the processing of steps S123 to S126 shown in FIG. 8.

The processing of step S127 is the same as the processing of step S127 shown in FIG. 7. If the processor 111 determines that the first communication device 121 is operating in the first mode in step S127, the processing of step S144 is performed. If the processor 111 determines that the first communication device 121 is not operating in the first mode in step S127, the processing of step S151 is performed.

If the processor 111 determines that imaging has not been performed by the image sensor 141 in step S144, the processing of step S146 is not performed, and the processing of step S123 is performed. Even if the processor 111 determines that the third mode has not been set in the wireless communication terminal 101b in step S145, the processing of step S146 is not performed and the processing of step S123 is performed.

(Step S151)

The processor 111 determines whether or not imaging has been performed by the image sensor 141. This processing is similar to the processing of step S144. If the processor 111 determines that imaging has been performed by the image sensor 141, the processing of step S152 is performed. If this determination is made in a state in which the sleep mode is set in the wireless communication terminal 101b, the processor 111 releases the setting of the sleep mode for the wireless communication terminal 101b. If the processor 111 determines that imaging has not been performed by the image sensor 141, the processing of step S153 is performed.

(Step S152)

The processor 111 determines whether or not the third mode has been set in the wireless communication terminal 101b. That is, the processor 111 determines whether or not the wireless communication terminal 101b is operating in the third mode. This processing is similar to the processing of step S145. If the processor 111 determines that the third mode has been set in the wireless communication terminal 101b, the processing of step S122 is performed. If the processor 111 determines that the third mode has not been set in the wireless communication terminal 101b, the processing of step S153 is performed.

(Step S153)

The processor 111 determines whether or not an instruction for setting the third mode has been received. This processing is similar to the processing of step S146. If the processor 111 determines that the instruction for setting the third mode has been received, the processing of step S122 is performed. On the basis of receiving the instruction for setting the third mode, the processor 111 sets the third mode in the wireless communication terminal 101b. If this determination is made in a state in which the sleep mode is set in the wireless communication terminal 101b, the processor 111 releases the setting of the sleep mode for the wireless communication terminal 101b. If the processor 111 determines that the instruction for setting the third mode has not been received, the processing of step S128 is performed.

The processing of steps S128 and S129 is the same as the processing of steps S128 and S129 shown in FIG. 7.

In terms of points other than the above, the process shown in FIGS. 16 and 17 is similar to the process shown in FIGS. 11 and 12.

In the operation shown in FIGS. 16 and 17, if the amount of data communication performed by the first communication device 121 is less than or equal to a predetermined amount (step S123) or if the wireless communication terminal 101b has transitioned from the first state to the second state (step S124), the processor 111 causes the first communication device 121 to stop the operation of the first mode (step S126). If the first condition and the third condition are satisfied and the second condition is not satisfied, the processor 111 causes the first communication device 121 to operate in the first mode (step S122). Thereafter, the processor 111 transmits instruction information to the fourth communication device 231 by the second communication device 131 (step S103). The instruction information is transmitted at a timing when the processor 111 determines that the third mode has been set in the wireless communication terminal 101b (steps S152 and S153) or at a timing when the image sensor 141 performs imaging (step S151).

Figure 18:
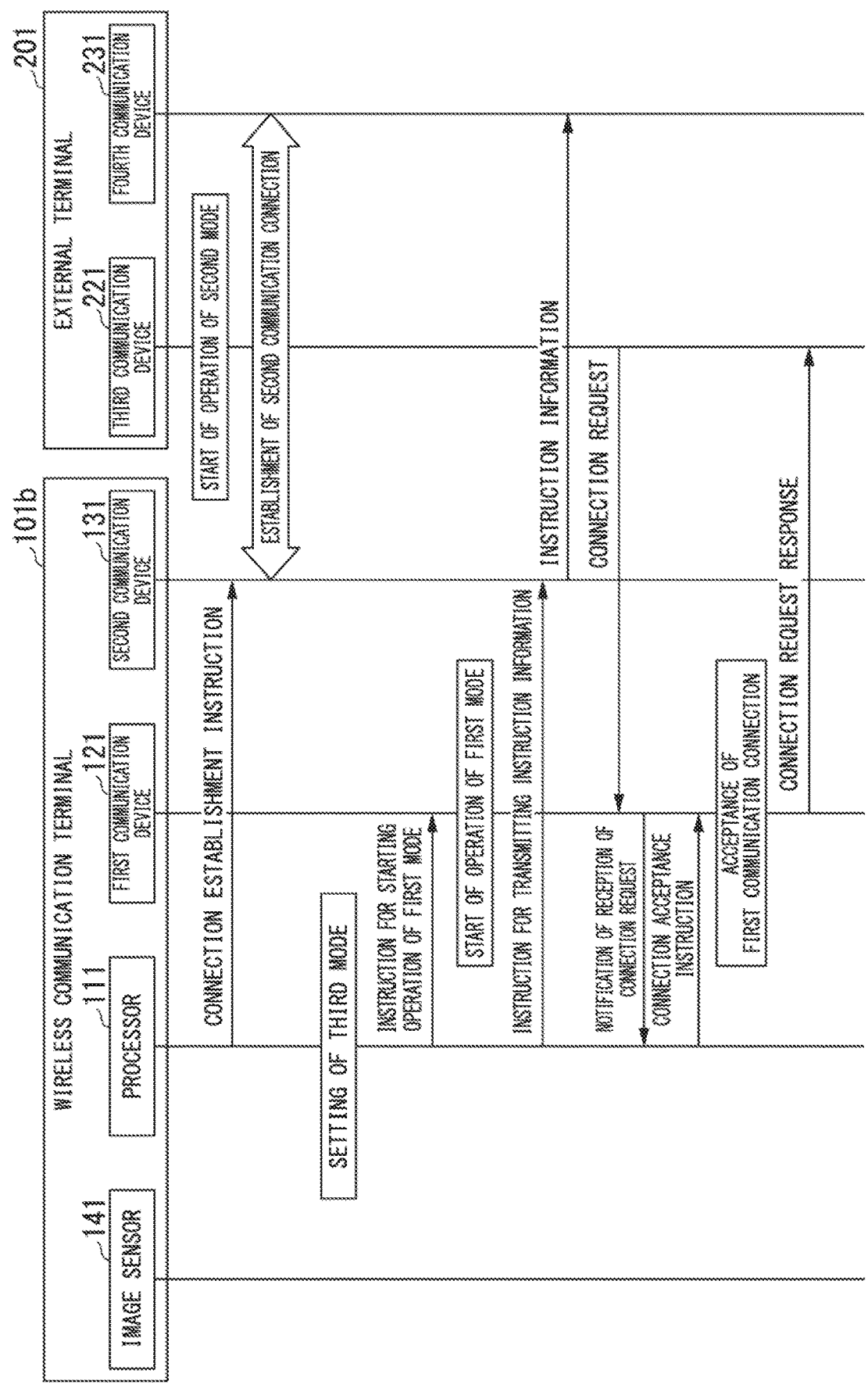
FIG. 18 is a sequence diagram showing a communication procedure in the fourth embodiment of the present invention.
Figure 19:
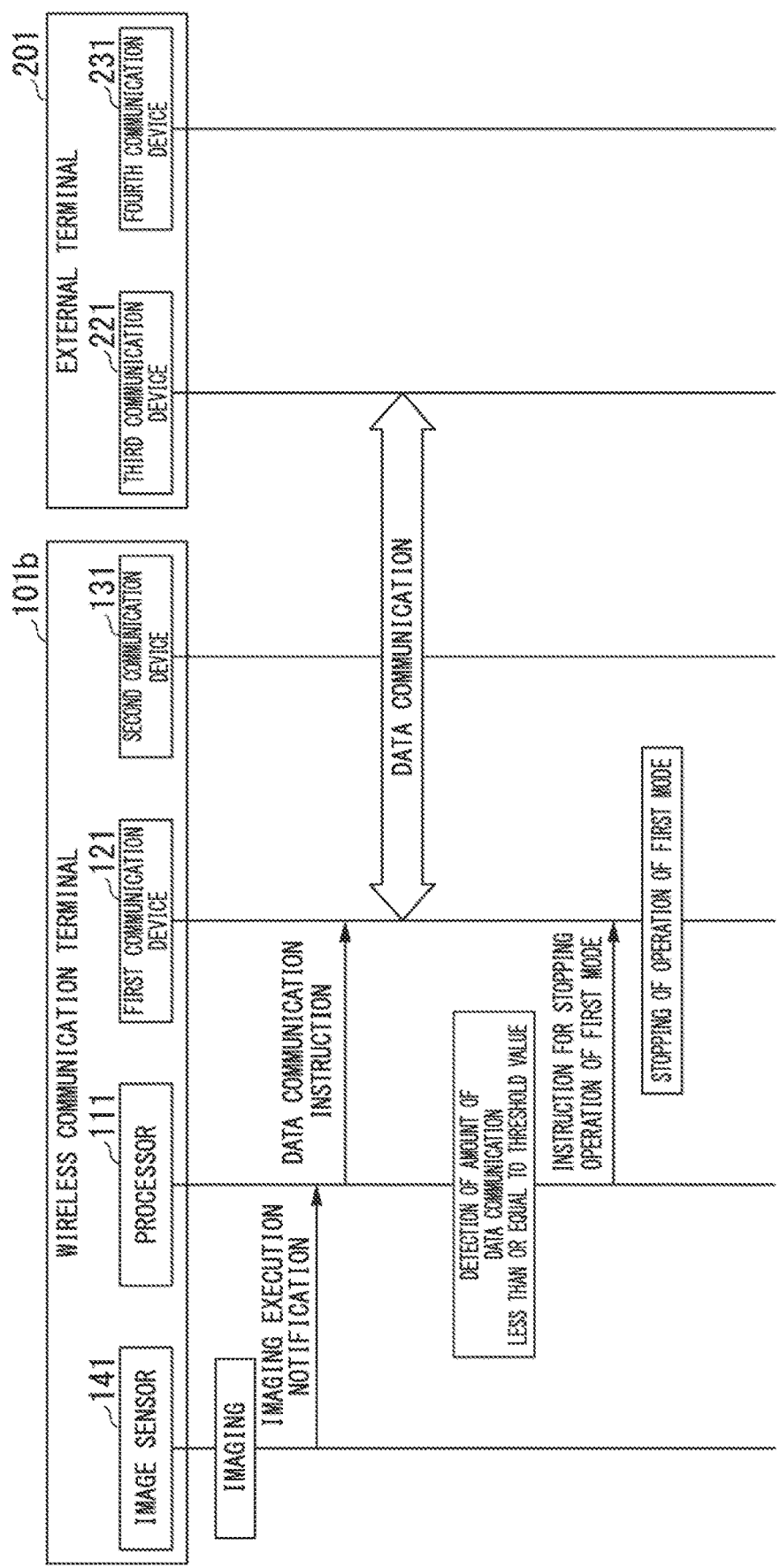
FIG. 19 is a sequence diagram showing a communication procedure in the fourth embodiment of the present invention.
Figure 20:
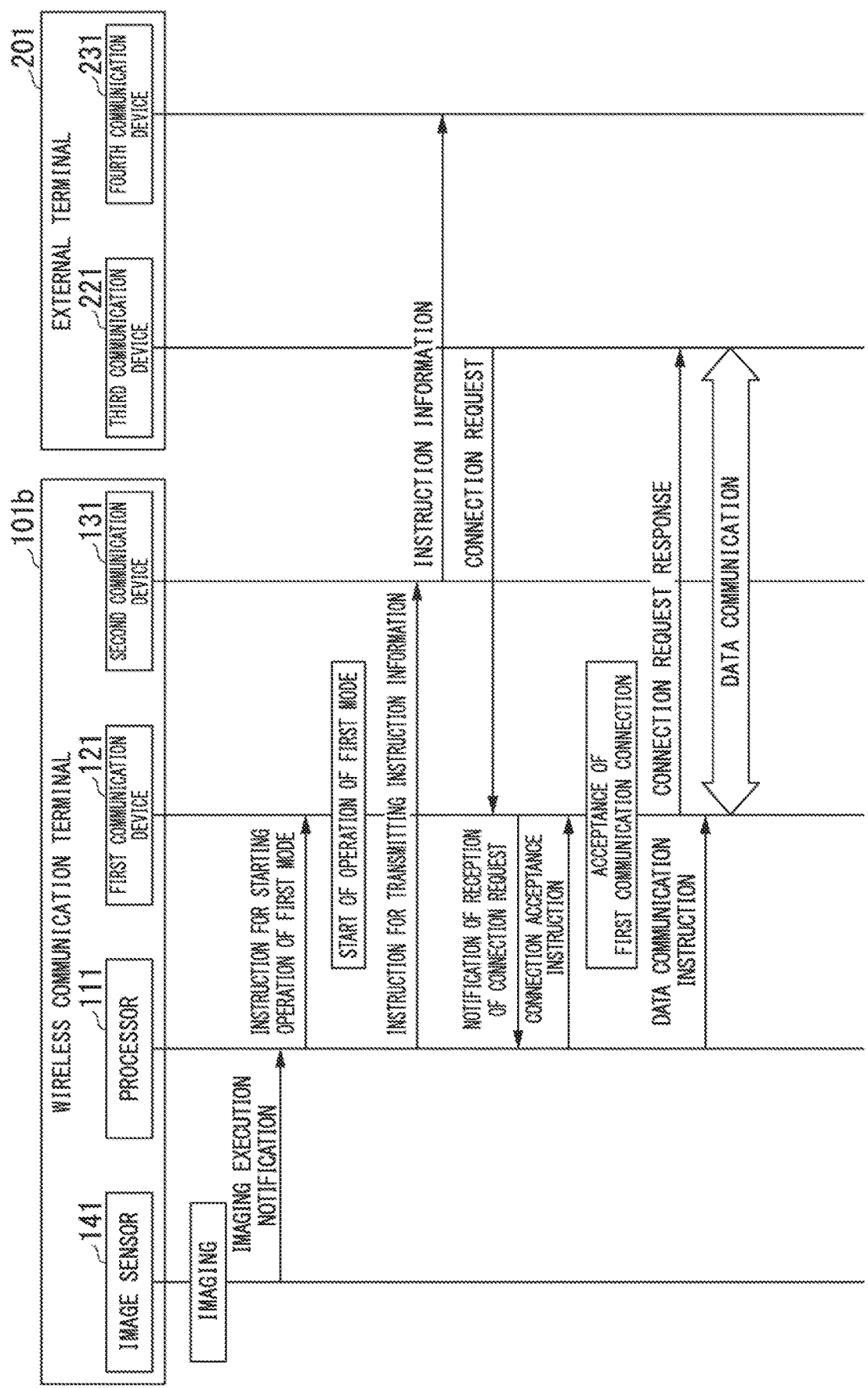
FIG. 20 is a sequence diagram showing a communication procedure in the fourth embodiment of the present invention.

FIGS. 18 to 20 show a procedure of communication between the wireless communication terminal 101b and the external terminal 201. After the communication shown in FIG. 18 is performed, the communication shown in FIG. 19 is performed. After the communication shown in FIG. 19 is performed, the communication shown in FIG. 20 is performed. In terms of an operation shown in FIGS. 18 to 20, differences from the operation shown in FIGS. 13 and 14 will be described.

An operation until the second communication connection is established by the second communication device 131 and the fourth communication device 231 is similar to the operation shown in FIGS. 13 and 14. After the second communication connection is started, the state of the second communication connection is a connected state (step S121) and the first communication device 121 is not operating in the first mode (step S127). Imaging is not performed by the image sensor 141 (step S151). Thereafter, the third mode is set in the wireless communication terminal 101b (step S153). Thus, the processor 111 instructs the first communication device 121 to start the operation of the first mode (step S122). The first communication device 121 starts the operation of the first mode (step S122). After the first communication device 121 starts the operation of the first mode, the processor 111 instructs the second communication device 131 to transmit the instruction information (step S103). The second communication device 131 transmits the instruction information to the fourth communication device 231 (step S103).

An operation until the connection request response is transmitted after the instruction information is transmitted is similar to the operation shown in FIG. 13. Because imaging is not performed by the image sensor 141, there is no image data capable of being transmitted to the external terminal 201 (step S148). Thus, data communication is not performed. The state of the second communication connection is the connected state (step S121) and the first communication device 121 is operating in the first mode (step S127). After a connection request response is transmitted, the image sensor 141 performs the first imaging. The image sensor 141 notifies the processor 111 of execution of the imaging (step S144). At this time, the third mode has already been set in the wireless communication terminal 101b (step S145).

There is image data capable of being transmitted to the external terminal 201 through the first imaging performed by the image sensor 141 (step S148). Thus, the processor 111 instructs the first communication device 121 to perform data communication (step S107). The first communication device 121 performs data communication with the third communication device 221 (step S107).

After the data communication is performed, the state of the second communication connection is the connected state (step S121), and the first communication device 121 is operating in the first mode (step S127). After the first imaging is performed by the image sensor 141, no imaging is performed by the image sensor 141 (step S144). Thereafter, the processor 111 detects the amount of data communication less than or equal to the threshold value (step S123). In the operation shown in FIG. 19, the processor 111 detects the amount of data communication less than or equal to the threshold value by monitoring the amount of data communication performed by the first communication device 121. The first communication device 121 may monitor the amount of data communication. The first communication device 121 may issue a notification to the processor 111 when the amount of data communication less than or equal to the threshold value has been detected.

When the amount of data communication less than or equal to the threshold value has been detected, the first communication device 121 is operating in the first mode (step S125). Therefore, the processor 111 instructs the first communication device 121 to stop the operation of the first mode (step S126). The first communication device 121 stops the operation of the first mode (step S126).

The state of the second communication connection is the connected state (step S121) and the first communication device 121 is not operating in the first mode (step S127). After the first communication device 121 stops the operation of the first mode, the image sensor 141 performs second imaging. The image sensor 141 notifies the processor 111 of execution of the imaging (step S151). At this time, the third mode has already been set in the wireless communication terminal 101b (step S152). Thus, the processor 111 instructs the first communication device 121 to start the operation of the first mode (step S122). The first communication device 121 starts the operation of the first mode (step S122). After the first communication device 121 starts the operation of the first mode, the processor 111 instructs the second communication device 131 to transmit instruction information (step S103). The second communication device 131 transmits the instruction information to the fourth communication device 231 (step S103). The operation after the instruction information is transmitted is similar to the operation shown in FIG. 14.

In terms of points other than the above, the operation shown in FIGS. 18 to 20 is similar to the operation shown in FIGS. 13 and 14.

The wireless communication terminal 101c shown in FIG. 15 may perform a process similar to the process performed by the wireless communication terminal 101b of the fourth embodiment.

As described above, if the first communication device 121 is not operating in the first mode, the first communication device 121 starts the operation of the first mode and the instruction information is transmitted at a timing when the processor 111 determines that the third mode has already been set in the wireless communication terminal 101b. Alternatively, if the first communication device 121 is operating in the first mode, the first communication device 121 starts the operation of the first mode and instruction information is transmitted at a timing when the instruction for setting the third mode has been received. Alternatively, if the first communication device 121 is operating in the first mode, the first communication device 121 starts the operation of the first mode and instruction information is transmitted at a timing when the image sensor 141 starts imaging. Thus, the wireless communication terminal 101b can establish the first communication connection at the timing related to the setting of the third mode or the timing when imaging is performed. Also, when imaging is performed by the image sensor 141, the wireless communication terminal 101b can immediately transfer image data to the external terminal 201.

After the first communication connection is established at the timing related to the setting of the third mode, the first communication device 121 may stop the operation of the first mode due to a decrease in the amount of data communication or the start of the sleep mode. However, if the operation of the third mode continues, imaging is performed by the image sensor 141, so that the first communication device 121 starts the operation of the first mode and the first communication connection is established. Furthermore, the wireless communication terminal 101b can immediately transfer the image data to the external terminal 201. Therefore, when imaging is performed in the wireless communication terminal 101b, the wireless communication terminal 101b can be wirelessly connected to the external terminal 201 in accordance with the first communication protocol.

Fifth Embodiment

A fifth embodiment of the present invention will be described using the wireless communication terminal 101 shown in FIG. 2 and the external terminal 201 shown in FIG. 3.

The processor 111 determines whether or not a first instruction or a second instruction has been received. The first instruction is an instruction for acquiring sensor data stored by the external terminal 201. The second instruction is an instruction for turning the first communication device 121 from a communication disabled state to a communication enabled state. When the first condition, the second condition, and a fifth condition are satisfied, the processor 111 transmits instruction information to the fourth communication device 231 by the second communication device 131. The fifth condition is a condition that the processor 111 determines that the first instruction or the second instruction has been received.

For example, the external terminal 201 has at least one of a global positioning system (GPS) sensor, a pressure sensor, and a temperature sensor. The GPS sensor generates position data as sensor data. The pressure sensor generates pressure data as sensor data. The temperature sensor generates temperature data as sensor data. The sensor provided in the external terminal 201 may be a sensor other than these sensors.

Figure 21:
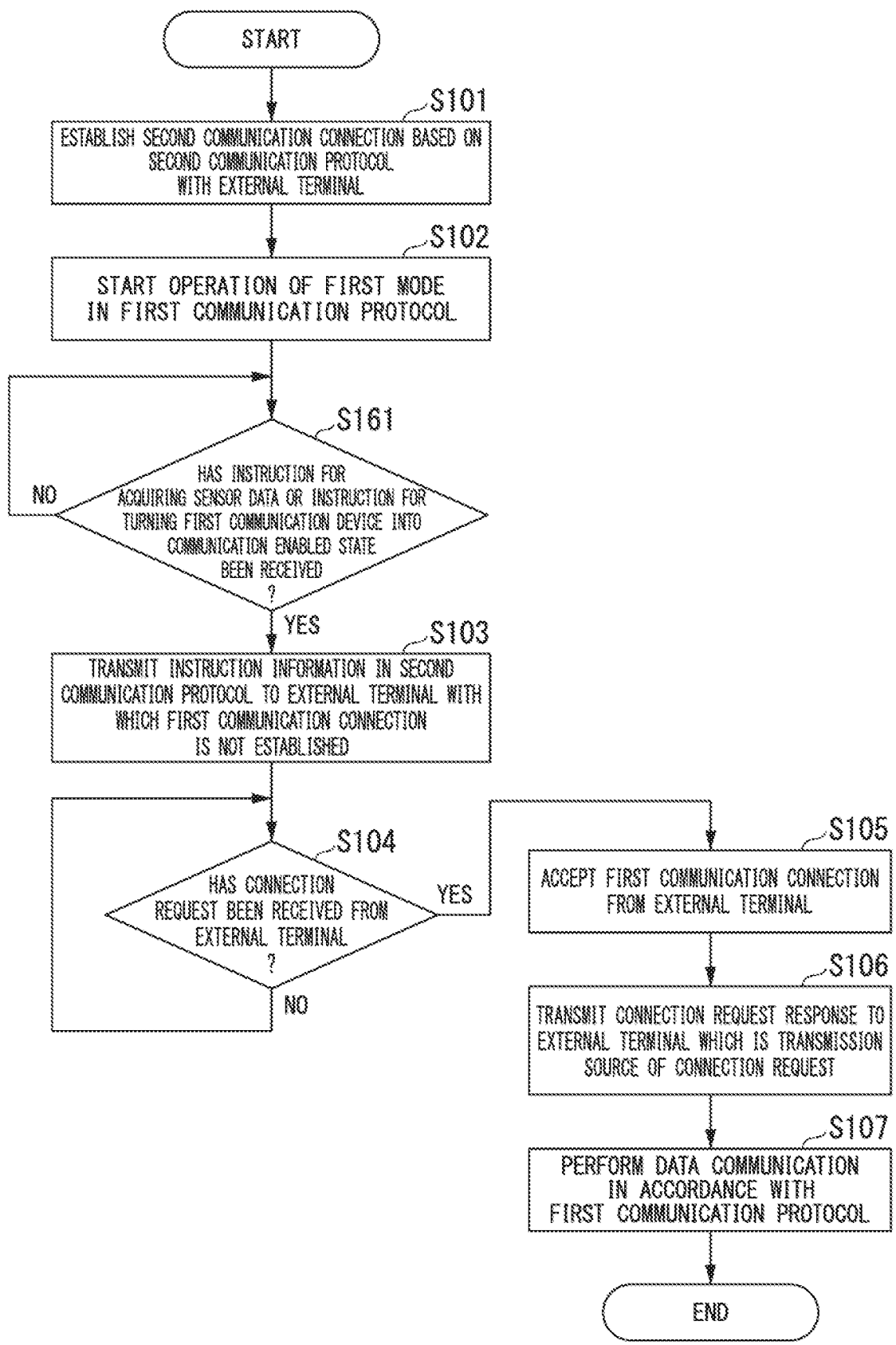
FIG. 21 is a flowchart showing a procedure of an operation of a wireless communication terminal according to a fifth embodiment of the present invention.

The operation of the wireless communication terminal 101 will be described. FIG. 21 shows the operation of the wireless communication terminal 101. In terms of the process shown in FIG. 21, differences from the process shown in FIG. 4 will be described.

(Step S161)

After the first communication device 121 starts the operation of the first mode in step S102, the processor 111 determines whether or not an instruction for acquiring sensor data (the first instruction) or an instruction for turning the first communication device 121 into the communication enabled state (the second instruction) has been received. For example, the first instruction and the second instruction are input by the user via the operation unit. The second communication device 131 or another communication device (not shown) may receive the second instruction from the external terminal 201. If the processor 111 determines that neither the first instruction nor the second instruction has been received, the processing of step S161 continues. If the processor 111 determines that either the first instruction or the second instruction has been received, the processing of step S103 is performed. In this case, the fifth condition is satisfied.

Because the first communication connection has not been established at a timing immediately after the power supply of the wireless communication terminal 101 is turned on, the first communication device 121 is set in the communication disabled state. As described above, the first communication connection is established, so that the wireless communication terminal 101 transitions from the communication disabled state to the data communication enabled state.

In terms of points other than the above, the process shown in FIG. 21 is similar to the process shown in FIG. 4.

Figure 22:
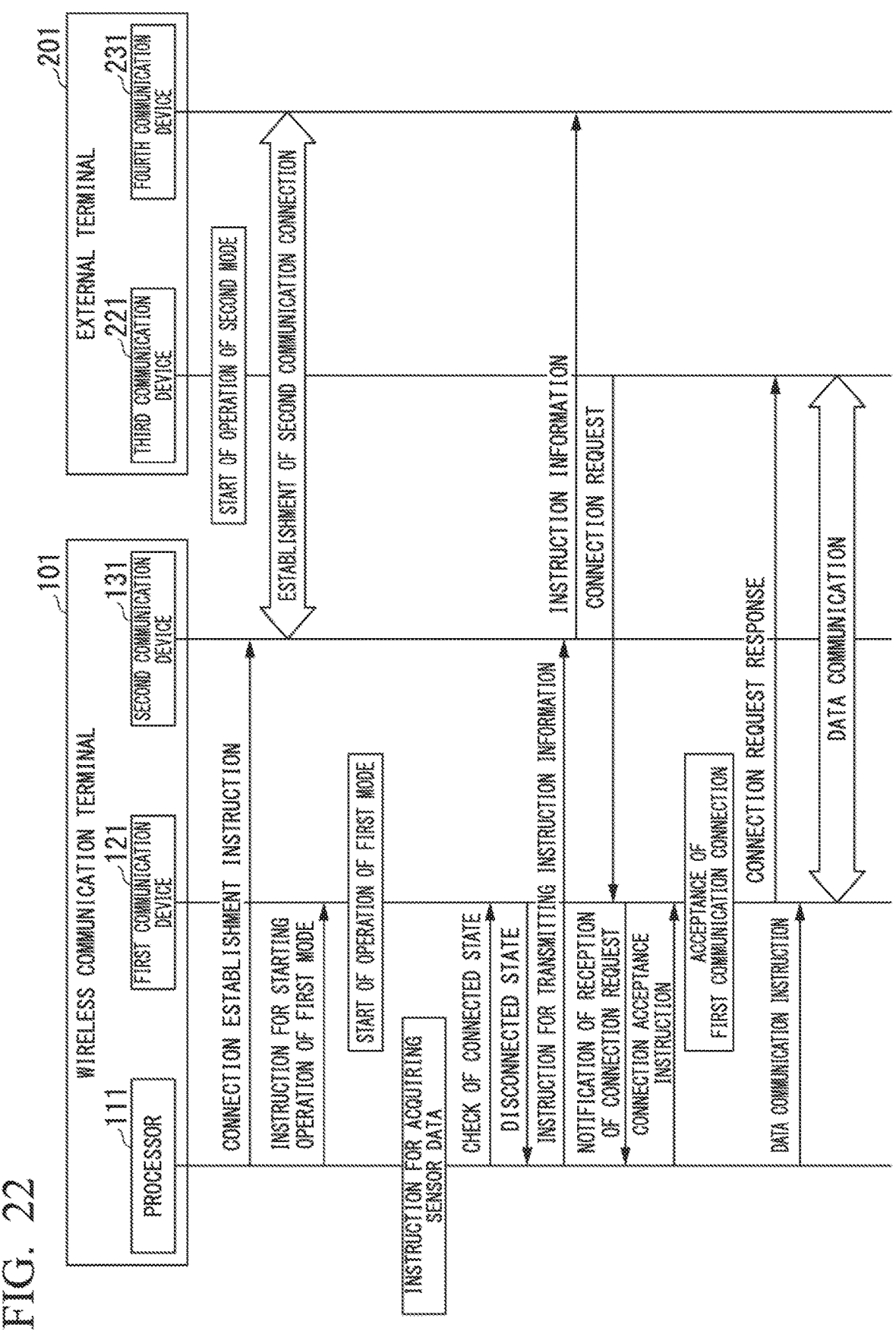
FIG. 22 is a sequence diagram showing a communication procedure in the fifth embodiment of the present invention.

FIG. 22 shows a procedure of communication between the wireless communication terminal 101 and the external terminal 201. In terms of the operation shown in FIG. 22, differences from the operation shown in FIG. 5 will be described.

An operation until the first communication device 121 starts the operation of the first mode is similar to the operation shown in FIG. 5. After the first communication device 121 starts the operation of the first mode, the processor 111 determines that an instruction for acquiring sensor data has been received (step S161). Thus, the processor 111 checks the state of the first communication connection by asking the first communication device 121 about the state of the first communication connection (step S103). The first communication device 121 responds to the processor 111 with the state of the first communication connection which is the disconnected state (step S103). Because the state of the first communication connection is the disconnected state, the processor 111 instructs the second communication device 131 to transmit instruction information (step S103). The second communication device 131 transmits the instruction information to the fourth communication device 231 (step S103).

The operation after the instruction information is transmitted is similar to the operation shown in FIG. 5. In terms of points other than the above, the operation shown in FIG. 22 is similar to the operation shown in FIG. 5.

The wireless communication terminal 101a shown in FIG. 10 may perform a process similar to a process performed by the wireless communication terminal 101 of the fifth embodiment.

As described above, the instruction information is transmitted at a timing when the first instruction or the second instruction has been received. Thus, at the timing when the first instruction or the second instruction has been received, the wireless communication terminal 101 can establish a wireless connection with the external terminal 201 in accordance with the first communication protocol.

Instruction information may be transmitted at a timing when an instruction other than the first instruction and the second instruction described above has been received. For example, if the first communication device 121 stops the operation of the first mode and the second communication device 131 or another communication device (not shown) has received an instruction for causing the first communication device 121 to start the operation of the first mode from the external terminal 201, the instruction information may be transmitted.

While preferred embodiments of the invention have been described and shown above, it should be understood that these are exemplars of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A wireless communication terminal comprising:
   a first communication device configured to perform wireless communication in accordance with a first communication protocol;
   a second communication device configured to perform wireless communication in accordance with a second communication protocol; and
   one or more processors,
   wherein an external terminal includes
      a third communication device configured to perform wireless communication in accordance with the first communication protocol, and
      a fourth communication device configured to perform wireless communication in accordance with the second communication protocol,
   the first communication protocol and the second communication protocol include at least a protocol of a data link layer,
   a master device mode and a slave device mode are defined in the first communication protocol,
   the second communication protocol is different from the first communication protocol,
   when the first communication device operates in the master device mode and the third communication device operates in the slave device mode, a first communication connection for data communication of a layer higher than the data link layer is able to be established in accordance with the first communication protocol between the first communication device and the third communication device,
   when the first communication device operates in the master device mode and the third communication device operates in the slave device mode, only the third communication device of the first and third communication devices is able to transmit a connection request in accordance with the first communication protocol,
   when a first condition and a second condition are satisfied, the processor transmits instruction information to the fourth communication device by the second communication device,
   when the instruction information is transmitted to the fourth communication device, the first communication connection is not established between the first communication device and the third communication device, the instruction information being information for instructing the external terminal to transmit the connection request for the wireless communication terminal, the first condition being a condition that a second communication connection based on the second communication protocol is established between the second communication device and the fourth communication device, and the second condition being a condition that the first communication device is operating in the master device mode,
   if the connection request transmitted by the third communication device has been received by the first communication device after the transmission of the instruction information to the fourth communication device, the processor establishes the first communication connection with the third communication device in accordance with the first communication protocol by the first communication device, and
   after the first communication connection is established, the processor transmits image data to the third communication device by the first communication device.

2. The wireless communication terminal according to claim 1,
   wherein, if the amount of data communication performed by the first communication device is less than or equal to a predetermined amount or if the wireless communication terminal has transitioned from a first state to a second state, the processor causes the first communication device to stop an operation of the master device mode and power consumption of the wireless communication terminal in the second state is controlled to be less than power consumption of the wireless communication terminal in the first state, and
   if the first condition is satisfied and the second condition is not satisfied, the processor transmits the instruction information to the fourth communication device by the second communication device after causing the first communication device to operate in the master device mode.

3. The wireless communication terminal according to claim 1, further comprising:
   an image sensor configured to generate the image data by performing imaging.

4. The wireless communication terminal according to claim 3,
   wherein the wireless communication terminal is operable in a third mode in which the image data is transmitted to the external terminal,
   wherein the processor determines whether or not the third mode has been set in the wireless communication terminal, and when the first condition, the second condition, and a third condition are satisfied, the processor transmits the instruction information to the fourth communication device by the second communication device, the third condition being a condition that the processor determines that the third mode has been set in the wireless communication terminal.

5. The wireless communication terminal according to claim 4,
wherein the processor determines a state of the first communication connection between the first communication device and the third communication device, the state of the first communication connection is one of a connected state and a disconnected state, and
when the first condition, the second condition, the third condition, and a fourth condition are satisfied, the processor transmits the instruction information to the fourth communication device by the second communication device, the fourth condition being a condition that the state of the first communication connection is the disconnected state.

6. The wireless communication terminal according to claim 4, wherein a timing when the instruction information is transmitted is a timing when the processor determines that the third mode has been set in the wireless communication terminal.

7. The wireless communication terminal according to claim 3, wherein a timing when the instruction information is transmitted is a timing when the image sensor performs imaging.

8. The wireless communication terminal according to claim 4, wherein, if the first condition and the third condition are satisfied and the second condition is not satisfied, the processor transmits the instruction information to the fourth communication device by the second communication device after causing the first communication device to operate in the master device mode.

9. The wireless communication terminal according to claim 8, wherein a timing when the instruction information is transmitted is a timing when the processor determines that the third mode has been set in the wireless communication terminal.

10. The wireless communication terminal according to claim 8, wherein a timing when the instruction information is transmitted is a timing when the image sensor performs imaging.

11. The wireless communication terminal according to claim 1, wherein, if the amount of data communication performed by the first communication device is less than or equal to a predetermined amount or if the wireless communication terminal has transitioned from a first state to a second state, the processor causes the first communication device to stop an operation of the master device mode and power consumption of the wireless communication terminal in the second state is controlled to be less than power consumption of the wireless communication terminal in the first state.

12. A wireless communication system including a wireless communication terminal and an external terminal,
wherein the wireless communication terminal includes:
a first communication device configured to perform wireless communication in accordance with a first communication protocol;
a second communication device configured to perform wireless communication in accordance with a second communication protocol; and
one or more processors,
the external terminal includes:
a third communication device configured to perform wireless communication in accordance with the first communication protocol, and
a fourth communication device configured to perform wireless communication in accordance with the second communication protocol,
the first communication protocol and the second communication protocol include at least a protocol of a data link layer,
a master device mode and a slave device mode are defined in the first communication protocol,
the second communication protocol is different from the first communication protocol,
when the first communication device operates in the master device mode and the third communication device operates in the slave device mode, a first communication connection for data communication of a layer higher than the data link layer is able to be established in accordance with the first communication protocol between the first communication device and the third communication device,
when the first communication device operates in the master device mode and the third communication device operates in the slave device mode, only the third communication device of the first and third communication devices is able to transmit a connection request in accordance with the first communication protocol,
when a first condition and a second condition are satisfied, the processor transmits instruction information to the fourth communication device by the second communication device,
when the instruction information is transmitted to the fourth communication device, the first communication connection is not established between the first communication device and the third communication device, the instruction information being information for instructing the external terminal to transmit the connection request for the wireless communication terminal, the first condition being a condition that a second communication connection based on the second communication protocol is established between the second communication device and the fourth communication device, and the second condition being a condition that the first communication device is operating in the master device mode,
if the connection request transmitted by the third communication device has been received by the first communication device after the transmission of the instruction information to the fourth communication device, the processor establishes the first communication connection with the third communication device in accordance with the first communication protocol by the first communication device,
after the first communication connection is established, the processor transmits image data to the third communication device by the first communication device,
the fourth communication device receives the instruction information transmitted by the second communication device,
after the instruction information is received, the third communication device transmits the connection request to the first communication device,
after the connection request is transmitted, the third communication device establishes the first communication connection with the first communication device, and after the first communication connection is established, the third communication device receives the image data from the first communication device.

13. A wireless communication method having a first step, a second step, and a third step executed by a wireless communication terminal,
    wherein the wireless communication terminal includes:
        a first communication device configured to perform wireless communication in accordance with a first communication protocol; and
        a second communication device configured to perform wireless communication in accordance with a second communication protocol,
    an external terminal includes:
        a third communication device configured to perform wireless communication in accordance with the first communication protocol; and
        a fourth communication device configured to perform wireless communication in accordance with the second communication protocol,
    the first communication protocol and the second communication protocol include at least a protocol of a data link layer,
    a master device mode and a slave device mode are defined in the first communication protocol,
    the second communication protocol is different from the first communication protocol,
    when the first communication device operates in the master device mode and the third communication device operates in the slave device mode, a first communication connection for data communication of a layer higher than the data link layer is able to be established in accordance with the first communication protocol between the first communication device and the third communication device,
    when the first communication device operates in the master device mode and the third communication device operates in the slave device mode, only the third communication device of the first and third communication devices is able to transmit a connection request in accordance with the first communication protocol,
    when a first condition and a second condition are satisfied, the second communication device transmits instruction information to the fourth communication device in the first step,
    when the instruction information is transmitted to the fourth communication device, the first communication connection is not established between the first communication device and the third communication device, the instruction information being information for instructing the external terminal to transmit the connection request for the wireless communication terminal, the first condition being a condition that a second communication connection based on the second communication protocol is established between the second communication device and the fourth communication device, and the second condition being a condition that the first communication device is operating in the master device mode,
    if the connection request transmitted by the third communication device has been received by the first communication device after the transmission of the instruction information to the fourth communication device, the first communication device establishes the first communication connection with the third communication device in accordance with the first communication protocol in the second step, and after the first communication connection is established, the first communication device transmits image data to the third communication device in the third step.

14. A computer-readable non-transitory recording medium recording a program for causing a computer of a wireless communication terminal to execute a first step, a second step, and a third step,
    wherein the wireless communication terminal includes:
        a first communication device configured to perform wireless communication in accordance with a first communication protocol; and
        a second communication device configured to perform wireless communication in accordance with a second communication protocol,
    an external terminal includes:
        a third communication device configured to perform wireless communication in accordance with the first communication protocol; and
        a fourth communication device configured to perform wireless communication in accordance with the second communication protocol,
    the first communication protocol and the second communication protocol include at least a protocol of a data link layer,
    a master device mode and a slave device mode are defined in the first communication protocol,
    the second communication protocol is different from the first communication protocol,
    when the first communication device operates in the master device mode and the third communication device operates in the slave device mode, a first communication connection for data communication of a layer higher than the data link layer is able to be established in accordance with the first communication protocol between the first communication device and the third communication device,
    when the first communication device operates in the master device mode and the third communication device operates in the slave device mode, only the third communication device of the first and third communication devices is able to transmit a connection request in accordance with the first communication protocol,
    when a first condition and a second condition are satisfied, the second communication device transmits instruction information to the fourth communication device in the first step,
    when the instruction information is transmitted to the fourth communication device, the first communication connection is not established between the first communication device and the third communication device, the instruction information being information for instructing the external terminal to transmit the connection request for the wireless communication terminal, the first condition being a condition that a second communication connection based on the second communication protocol is established between the second communication device and the fourth communication device, and the second condition being a condition that the first communication device is operating in the master device mode,
    if the connection request transmitted by the third communication device has been received by the first communication device after the transmission of the instruction information to the fourth communication device, the first communication device establishes the first communication connection with the third communication device in accordance with the first communication protocol in the second step, and after the first communication connection is established, the first communication device transmits image data to the third communication device in the third step.

* * * * *